(12) United States Patent
Fujii et al.

(10) Patent No.: US 11,970,212 B2
(45) Date of Patent: Apr. 30, 2024

(54) AUTOMOTIVE-STRUCTURAL-PART JOINT STRUCTURE, AUTOMOTIVE STRUCTURAL PART, AND AUTOMOTIVE-STRUCTURAL-PART MANUFACTURING METHOD

(71) Applicant: JFE STEEL CORPORATION, Tokyo (JP)

(72) Inventors: Yusuke Fujii, Tokyo (JP); Masaki Urabe, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 479 days.

(21) Appl. No.: 17/435,681

(22) PCT Filed: Nov. 12, 2019

(86) PCT No.: PCT/JP2019/044247
§ 371 (c)(1),
(2) Date: Sep. 1, 2021

(87) PCT Pub. No.: WO2020/188877
PCT Pub. Date: Sep. 24, 2020

(65) Prior Publication Data
US 2022/0152680 A1    May 19, 2022

(30) Foreign Application Priority Data
Mar. 19, 2019  (JP) .................................. 2019-050752

(51) Int. Cl.
*B62D 25/00* (2006.01)
*B21D 5/01* (2006.01)
(Continued)

(52) U.S. Cl.
CPC ............... *B62D 25/00* (2013.01); *B21D 5/01* (2013.01); *B21D 19/08* (2013.01); *B21D 53/88* (2013.01); *B62D 29/00* (2013.01)

(58) Field of Classification Search
CPC .......... B21D 5/01; B21D 19/08; B21D 23/88; B62D 29/00; B62D 25/08; B62D 25/082
(Continued)

(56) References Cited

U.S. PATENT DOCUMENTS 6,129,412 A    10/2000 Tanuma
11,027,781 B2 *   6/2021 Otsuka .................. B21D 22/20
(Continued)

FOREIGN PATENT DOCUMENTS

CN    1891554 A    1/2007
CN    109414745 A    3/2019
(Continued)

OTHER PUBLICATIONS

Mar. 18, 2022 Extended Search Report issued in European Patent Application No. 19920163.3.
(Continued)

*Primary Examiner* — Jason S Morrow
(74) *Attorney, Agent, or Firm* — Oliff PLC

(57) ABSTRACT

An automotive-structural-part joint structure is formed by bending one metal sheet, includes a groove portion including a top portion and a pair of side wall portions, is provided at an end part of one automotive structural part in a longitudinal direction, and is configured to join the one automotive structural part to another automotive structural part in an intersecting direction. The automotive-structural-part joint structure includes: a pair of vertical rib portions configured to stand upward from both side ends of the top portion; and an outward-directed flange portion configured to extend outward from three side edges of the groove portion on an
(Continued)

end part side where the other automotive structural part is joined, the flange portion being continuously formed along the three side edges.

11 Claims, 11 Drawing Sheets

(51) Int. Cl.
*B21D 19/08* (2006.01)
*B21D 53/88* (2006.01)
*B62D 29/00* (2006.01)

(58) Field of Classification Search
USPC .... 296/187.01, 193.01, 193.09, 205, 203.02; 29/897.2
See application file for complete search history.

(56) References Cited

U.S. PATENT DOCUMENTS

| | | | |
|---|---|---|---|
| 11,135,633 B2 | 10/2021 | Tanaka et al. | |
| 11,623,261 B2* | 4/2023 | Otsuka | B21D 37/12 428/598 |
| 11,674,315 B2* | 6/2023 | Iftissen | B21D 19/08 29/505 |
| 11,865,606 B2* | 1/2024 | Sato | B21D 28/26 |
| 2002/0185892 A1 | 12/2002 | Rima et al. | |
| 2009/0188100 A1 | 7/2009 | Durney et al. | |
| 2015/0003898 A1 | 1/2015 | Shiozaki | |
| 2015/0061323 A1 | 3/2015 | Otsuka et al. | |
| 2017/0349219 A1 | 12/2017 | Kawachi et al. | |
| 2019/0160510 A1 | 5/2019 | Tanaka et al. | |
| 2019/0300060 A1 | 10/2019 | Otsuka | |
| 2023/0044854 A1* | 2/2023 | Ishizuka | B21D 22/025 |
| 2023/0101313 A1* | 3/2023 | Otsuka | B62D 29/007 29/897.2 |
| 2023/0271581 A1* | 8/2023 | Nambu | B62D 25/08 296/187.09 |

FOREIGN PATENT DOCUMENTS

| | | |
|---|---|---|
| EP | 1 741 619 A1 | 1/2007 |
| EP | 1 741 619 B1 | 8/2009 |
| IT | TO20 010 435 A1 | 11/2002 |
| JP | H11-291953 A | 10/1999 |
| JP | 2000-25655 A | 1/2000 |
| JP | 2014-008508 A | 1/2014 |
| JP | 5382271 B1 | 1/2014 |
| JP | 5835768 B2 | 12/2015 |
| JP | 2017-042826 A | 3/2017 |
| WO | 2013/154114 A1 | 10/2013 |
| WO | 2018/012603 A1 | 1/2018 |

OTHER PUBLICATIONS

Dec. 5, 2022 Office Action issued in Chinese Patent Application No. 201980094151.9.
Dec. 17, 2019 International Search Report issued in International Patent Application No. PCT/JP2019/044247.

* cited by examiner (a) ○ : SPOT WELDING POINT (b) ○ : SPOT WELDING POINT (a)  (b)

(a)  (b)

AUTOMOTIVE-STRUCTURAL-PART JOINT STRUCTURE, AUTOMOTIVE STRUCTURAL PART, AND AUTOMOTIVE-STRUCTURAL-PART MANUFACTURING METHOD

FIELD

The present invention relates to an automotive-structural-part joint structure and an automotive structural part that are each formed by bending one metal sheet, and an automotive-structural-part manufacturing method, and particularly relates to an automotive-structural-part joint structure and an automotive structural part that are each joined to another automotive structural part in an intersecting direction, and an automotive-structural-part manufacturing method.

BACKGROUND

Components used for a vehicle such as an automobile include panel parts that cover the outside of the vehicle, and automotive structural parts that provide the stiffness of the vehicle and strength for protecting passengers in times of a collision. Most automotive structural parts are those disposed in the front-back direction of the vehicle, such as side sills and a center tunnel, and those disposed in the right-left direction of the vehicle such as cross members, and they are joined with each other in an intersecting direction to configure a vehicle structure. Thus, the stiffness and strength of not only each automotive structural part but also a joint structure in which automotive structural parts are joined with each other are important properties.

Among automotive structural parts, side sills and cross members function to receive a load at collision on side surfaces of the vehicle. Thus, for example, as in a floor-part automotive body structure of an automobile disclosed in Patent Literature 1, a mounting flange is formed at each end part of each cross member in the longitudinal direction, and the mounting flange is joined to the corresponding side sill by welding or the like.

The mounting flange in the technology disclosed in Patent Literature 1 corresponds to a joint structure 81, as illustrated in FIG. 15, in which a flange portion 89 is provided at an end part of a groove portion 87 including a top portion 83 and a pair of side wall portions 85, the joint structure 81 including a corner portion at continuous flange 89c connecting a flange portion adjacent to top 89a extending from the top portion 83 with a flange portion adjacent to side wall 89b extending from the corresponding one of the side wall portions 85.

The corner portion at continuous flange 89c is a site subjected to stretch flanging deformation in a process of manufacturing the joint structure 81 from one metal sheet by press forming. Thus, a metal sheet having excellent ductility needs to be used to form the corner portion at continuous flange 89c without causing fracture.

Recently, a high-strength steel sheet has been often used for an automotive structural part such as a cross member to increase safety at automotive collision. However, the high-strength steel sheet tends to have poor ductility, and thus is requested to be manufactured only by bending without stretching at an automotive-structural-part manufacturing process.

Thus, Patent Literature 2 and Patent Literature 3 disclose technologies related to a joint-portion structure or a joint structure in which an opening part or a cutout is provided at a site corresponding to a corner portion at continuous flange to prevent fracture due to stretch flanging deformation.

In addition, Patent Literature 4 and Patent Literature 5 disclose technologies related to a component in which a site formed by overlapping parts of a metal sheet between a top portion and a side wall portion is provided as a measure for increasing component strength at collision.

CITATION LIST

Patent Literature

Patent Literature 1: Japanese Patent Application Laid-open No. H11-291953
Patent Literature 2: Japanese Patent Application Laid-open No. 2014-8508
Patent Literature 3: Japanese Patent No. 5382271
Patent Literature 4: Japanese Patent No. 5835768
Patent Literature 5: WO2018/012603

SUMMARY

Technical Problem

The technologies disclosed in Patent Literature 2 and Patent Literature 3 can produce a joint by using a high-strength steel sheet, but have such a problem that the stiffness of a site at which a hole or a cutout is provided to prevent fracture largely decreases. This is because, when external force is applied to a joint portion, the force concentratively acts on a site having a low stiffness.

Furthermore, the technologies disclosed in Patent Literature 4 and Patent Literature 5 are effective for increasing strength when a collision load is input in the longitudinal direction. However, when a flange portion is formed at an end part for joining to another member or automotive structural part, a site formed by overlapping metal sheets between a top portion and a side wall portion causes interference. There has been no joint structure in which a flange portion for joining to another member or an automotive structural part is provided at a longitudinal-direction end part of such a member or component formed by overlapping metal sheets, nor a method of manufacturing the joint structure.

The present invention is intended to solve the problem as described above and provide an automotive-structural-part joint structure, an automotive structural part, and an automotive-structural-part manufacturing method, the automotive-structural-part joint structure and the automotive structural part each being formed by bending one metal sheet and each including a flange portion continuously shaped along side edges at an end part of an automotive structural part in the longitudinal direction only by bending.

Note that a metal sheet in the present invention is a single sheet configured as various metals such as a hot-rolled steel sheet, a cold-rolled steel sheet, a stainless steel sheet, an aluminum sheet, a titanium sheet, and a magnesium sheet, and also includes a single sheet formed by providing zinc coating or organic coating to the surface of these metal sheets. In addition, an automotive structural part in the present invention includes a cross member joined to a side sill or a roof side rail in an intersecting direction, an A pillar, and a B pillar and may be any structural part joined to another automotive structural part in an intersecting direction. Moreover, an automotive structural part as a subject of the present invention may be an automotive structural part including a groove portion including a top portion and a pair of side wall portions, and may have any of a U-shaped cross section and a hat-shaped cross section.

Solution to Problem

An automotive-structural-part joint structure according to the present invention is formed by bending one metal sheet, the automotive-structural-part joint structure including a groove portion including a top portion and a pair of side wall portions, and the automotive-structural-part joint structure being provided at an end part of one automotive structural part in a longitudinal direction, and configured to join the one automotive structural part to another automotive structural part in an intersecting direction, and the automotive-structural-part joint structure includes: a pair of vertical rib portions configured to stand upward from both side ends of the top portion; and an outward-directed flange portion configured to extend outward from three side edges of the groove portion on an end part side where the other automotive structural part is joined, the flange portion being continuously formed along the three side edges, wherein each of the vertical rib portions is formed by overlapping parts of the metal sheet, one of the parts being bent upward and extending from a side end of the top portion, another part extending upward from an upper end of corresponding one of the side wall portions, and the flange portion includes parts of the metal sheet bent outward and extending from the respective side wall portions, a part of the metal sheet bent upward and extending from the top portion, and parts of the metal sheet bent outward and extending from the respective vertical rib portions.

A part of the metal sheet extending from the top portion side in each vertical rib portion may be removed at the flange portion.

An automotive structural part according to the present invention is formed by bending one metal sheet, the automotive structural part including a groove portion including a top portion and a pair of side wall portions, and being configured to join an end part of the groove portion in a longitudinal direction to another automotive structural part in an intersecting direction, and the automotive structural part includes: a pair of vertical rib portions formed over the entire length in the longitudinal direction to stand upward from both side ends of the top portion; and an outward-directed flange portion extending outward from three side edges of the groove portion on an end part side where the other automotive structural part is joined, the flange portion being continuously formed along the three side edges, wherein each of the vertical rib portions is formed by overlapping parts of the metal sheet, one of the parts being bent upward and extending from a side end of the top portion, another part extending upward from an upper end of corresponding one of the side wall portions, and the flange portion includes a part of the metal sheet bent upward and extending from the top portion, parts of the metal sheet bent outward and extending from the respective side wall portions, and parts of the metal sheet bent outward and extending from the respective vertical rib portions.

A part of the metal sheet extending from the top portion side in each vertical rib portion may be removed at the flange portion.

An automotive-structural-part manufacturing method according to the present invention manufactures the automotive structural part according to the present invention by bending one metal sheet, and the automotive-structural-part manufacturing method includes: a first bending step of, by using a punch and a pad configured to sandwich the metal sheet and a pair of first cams disposed on both sides of the punch and the pad, the first cams being configured to move toward the punch and the pad, bending the metal sheet into an intermediate product formed of the top portion, the side wall portions, and the vertical rib portions by moving the first cams toward the punch and the pad to fold parts of the metal sheet corresponding to the respective vertical rib portions of the automotive structural part while a part of the metal sheet corresponding to the top portion of the automotive structural part is sandwiched by the punch and the pad; and a second bending step of, by additionally using a second cam disposed on an end part side of the punch and the pad where the other automotive structural part is joined, the second cam being configured to move toward the punch and the pad, bending the intermediate product into the automotive structural part by moving the second cam toward the punch and the pad to bend a part of the metal sheet corresponding to the flange portion of the automotive structural part while the top portion of the intermediate product is sandwiched by the punch and the pad, and the side wall portions and the vertical rib portions of the intermediate product are sandwiched by the punch, the pad, and the first cams, wherein on the end part side of the groove portion where the other automotive structural part is joined, the second bending step includes forming a flange portion adjacent to top by bending upward a part of the metal sheet extending from the top portion, forming a flange portion adjacent to side wall by bending outward a part of the metal sheet extending from each of the side wall portions, and forming a vertical-rib flange portion by folding a part of the metal sheet extending from each of the vertical rib portions.

The automotive-structural-part manufacturing method may includes, before the first bending step, a pre-bending step of providing a fold line of mountain fold or valley fold at a boundary of each of the parts of the metal sheet corresponding to the top portion, the side wall portions, the vertical rib portions, and the flange portion of the automotive structural part.

The automotive-structural-part manufacturing method may includes, before the first bending step, a step of removing a part of the metal sheet extending from the top portion side in each vertical rib portion.

Advantageous Effects of Invention

According to the present invention, a flange portion continuously formed, only by bending of one metal sheet, along side edges on an end part side where joining to another automotive structural part occurs can be provided to improve the stiffness of a joint portion to the other automotive structural part, and a metal sheet having low ductility and high strength can be employed. In addition, a vertical rib portion formed by folding a metal sheet can be provided between a top portion and a side wall portion to improve strength against a load input in an axial direction and strength against 3-point bending deformation.

DESCRIPTION OF EMBODIMENTS

Figure 15:
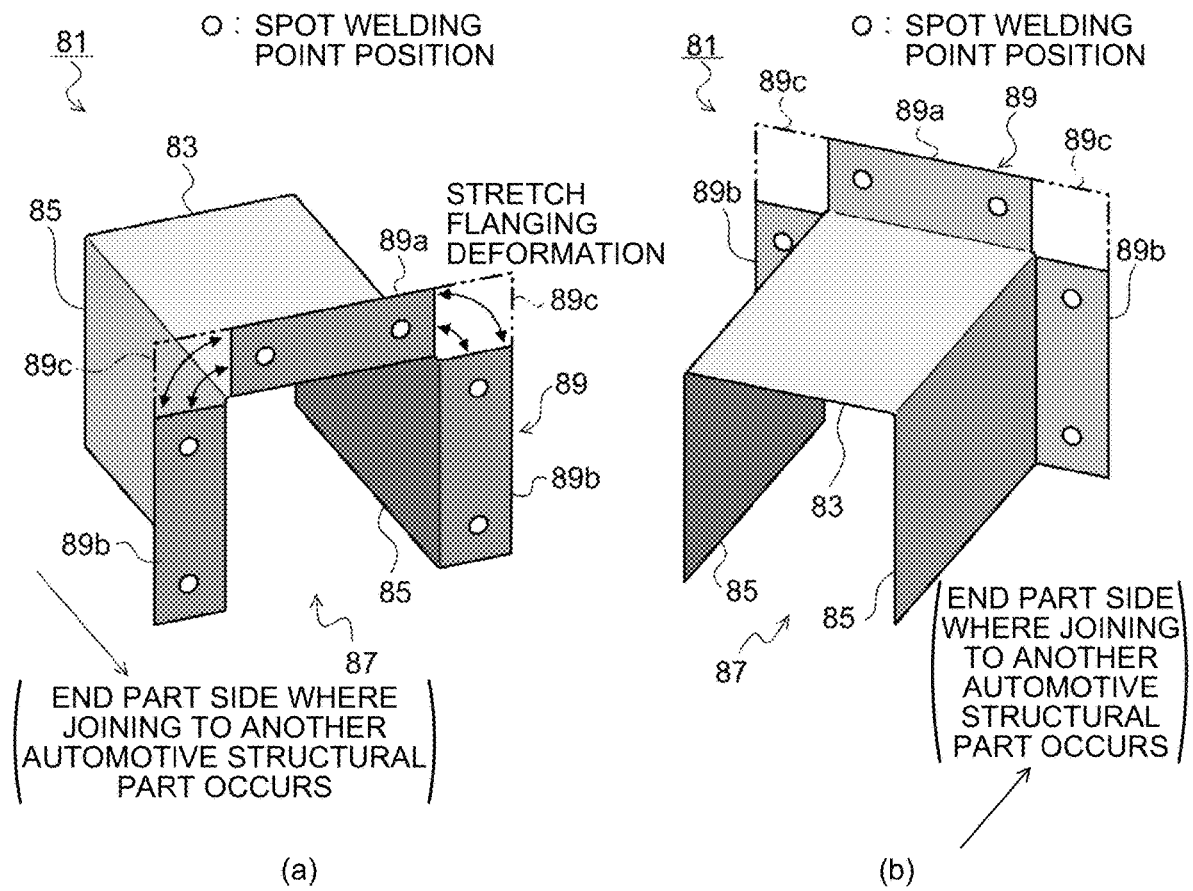
FIG. 15 is a diagram exemplarily illustrating a conventional automotive-structural-part joint structure and the positions of spot welding points to another automotive structural part in the joint structure.

As exemplarily illustrated in FIG. 15, a conventional automotive-structural-part joint structure 81 includes a groove portion 87 including a top portion 83 and a pair of side wall portions 85, and a flange portion adjacent to top 89a extending from the top portion 83 and each flange portion adjacent to side wall 89b extending from the corresponding side wall portion 85 are formed on an end part side of one automotive structural part.

To increase stiffness in a case of joining to another automotive structural part through such a joint structure 81, it is effective to have a shape in which the flange portion adjacent to top 89a and each flange portion adjacent to side walls 89b are continuous with each other through a corner portion at continuous flange 89c along three side edges of the groove portion 87. However, when one metal sheet is processed by press forming to have a shape in which the flange portion adjacent to top 89a and each flange portion adjacent to side wall 89b are continuously connected with each other through the corresponding corner portion at continuous flange 89c, fracture occurs to the corner portion at continuous flange 89c in a case in which a metal sheet having low ductility, such as a high-strength steel sheet, is used since the corner portion at continuous flange 89c is a site subjected to stretch flanging deformation.

Figure 16:
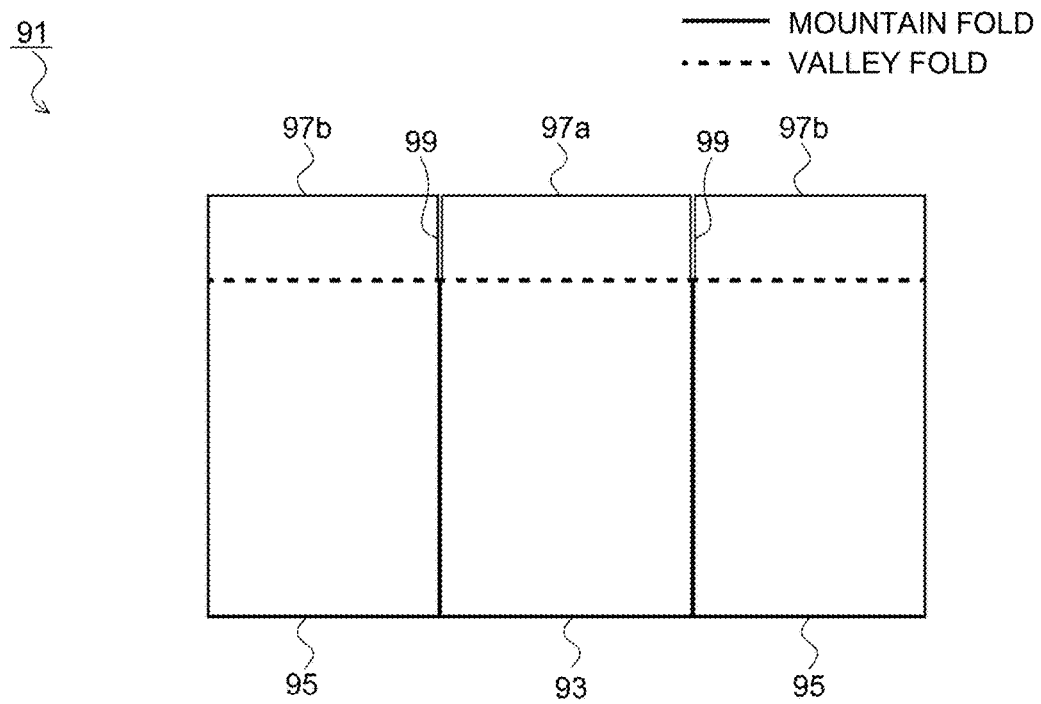
FIG. 16 is a diagram exemplarily illustrating the shape of a metal sheet used to manufacture a component including the conventional automotive-structural-part joint structure.

Thus, in a case in which a high-strength metal sheet is used, for example, it has been required that a metal sheet 91 in which a slit 99 is provided between a portion corresponding to flange adjacent to top 97a corresponding to the flange portion adjacent to top 89a and each portion corresponding to flange adjacent to side wall 97b corresponding to a flange portion adjacent to side wall 89b as illustrated in FIG. 16 is used to have bending with mountain fold or valley fold at each of the boundary between a portion corresponding to top 93 and each portion corresponding to side wall 95, the boundary between the portion corresponding to top 93 and the portion corresponding to flange adjacent to top 97a, and the boundary between each portion corresponding to side wall 95 and the portion corresponding to flange adjacent to side wall 97b, thereby producing the joint structure 81 in which the flange portion adjacent to top 89a and the flange portion adjacent to side wall 89b are not continuous with each other.

The present inventor has had diligent discussions to solve such a problem. Accordingly, the inventor focused on the following: at the site (corner portion at continuous flange 89c) where fracture occurs in the process of forming the outward-directed flange portion, the material stretches outward from the ridgeline between the top portion 83 and each side wall portion 85, resulting in stretch flanging deformation, and thus for preventing fracture, the material is first moved inward toward the ridgeline between the top portion 83 and the side wall portion 85 and subsequently, the material is bent outward to release excess material due to the inward movement.

Then, further discussions on means for specific implementation have found that it is possible to obtain, only by bending, a joint structure including a flange portion in which the flange portion adjacent to top and each flange portion adjacent to side wall are continuously formed by providing a vertical rib portion formed by folding the metal sheet between the top portion and each side wall portion and folding outward the vertical rib portion on an end part side where joining to another automotive structural part occurs.

The first to third embodiments of the present invention will be described below based on FIGS. 1 to 10. Note that, in the present specification, a case in which a top portion is positioned above a pair of side wall portions is described, but the positions of the top portion and the pair of side wall portions are not limited thereto in the present application invention. Thus, "above" in the present application invention is a relative direction indicating the top portion side based on the positional relation between the top portion and each side wall portion and does not indicate any absolute direction.

First Embodiment

Figure 1:
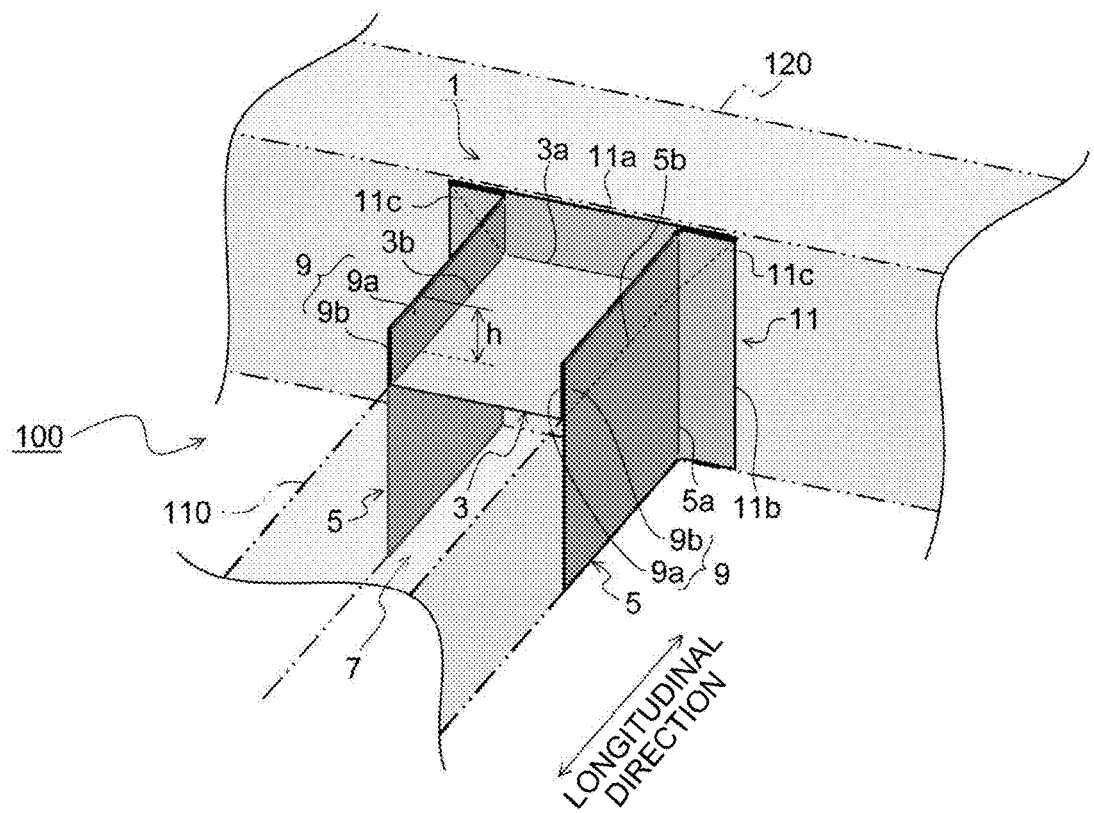
FIG. 1 is a diagram illustrating an automotive-structural-part joint structure according to a first embodiment of the present invention.

As illustrated in FIG. 1, an automotive-structural-part joint structure 1 (hereinafter simply referred to as a "joint structure 1") according to the first embodiment of the present invention 1 is formed by bending one metal sheet and provided at an end part of one automotive structural part 110 in the longitudinal direction and joins the one automotive structural part 110 to another automotive structural part 120 in an intersecting direction. The joint structure 1 includes a groove portion 7 including a top portion 3 and a pair of side wall portions 5, and includes a pair of vertical rib portions 9 formed to stand upward from both side ends 3b of the top portion 3, and an outward-directed flange portion 11 extending outward from three side edges (a side edge 3a of the top portion 3 and side edges 5a of a pair of side wall portions 5) of the groove portion 7 on an end part side where joining to the other automotive structural part occurs, the flange portion 11 being continuously formed along the three side edges.

As illustrated in FIG. 1, each vertical rib portion 9 is formed by overlapping a vertical rib portion on top portion side 9a and a vertical rib portion on side-wall portion side 9b, the vertical rib portion on top portion side 9a being a part of the metal sheet bent upward and extending from the corresponding side end 3b of the top portion 3, the vertical rib portion on side-wall portion side 9b being a part of the metal sheet extending upward from an upper end 5b of the corresponding side wall portion 5.

Figure 2:
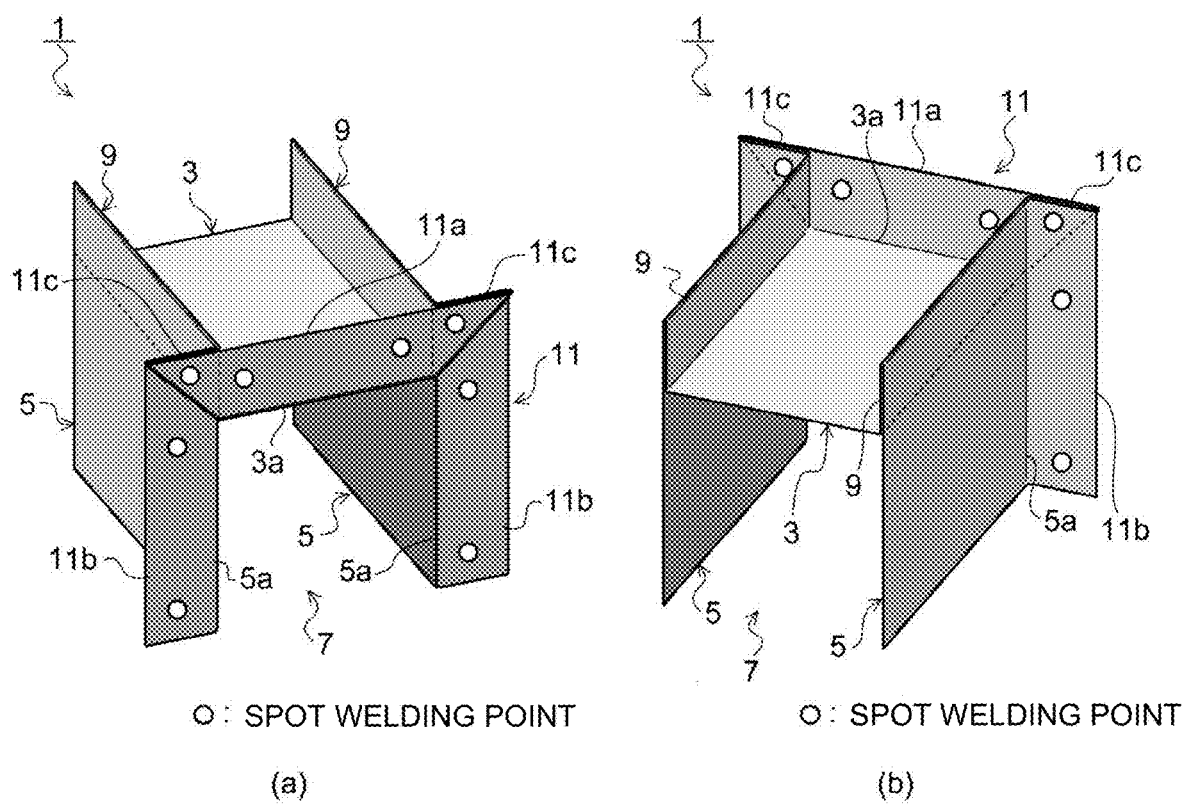
FIG. 2 is a diagram exemplarily illustrating the automotive-structural-part joint structure according to the first embodiment of the present invention and spot welding points of joining to another automotive structural part in the joint structure.

As illustrated in FIGS. 1 and 2, the flange portion 11 is constituted by a flange portion adjacent to top 11a, a flange portion adjacent to side wall 11b, and a vertical-rib flange portion 11c, the flange portion adjacent to top 11a being a part of the metal sheet bent upward and extending from the side edge 3a of the top portion 3, the flange portion adjacent to side wall 11b being a part of the metal sheet bent outward and extending from the side edge 5a of each side wall portion 5, the vertical-rib flange portion 11c being a part of the metal sheet bent outward and extending from each vertical rib portion 9.

Figure 3:
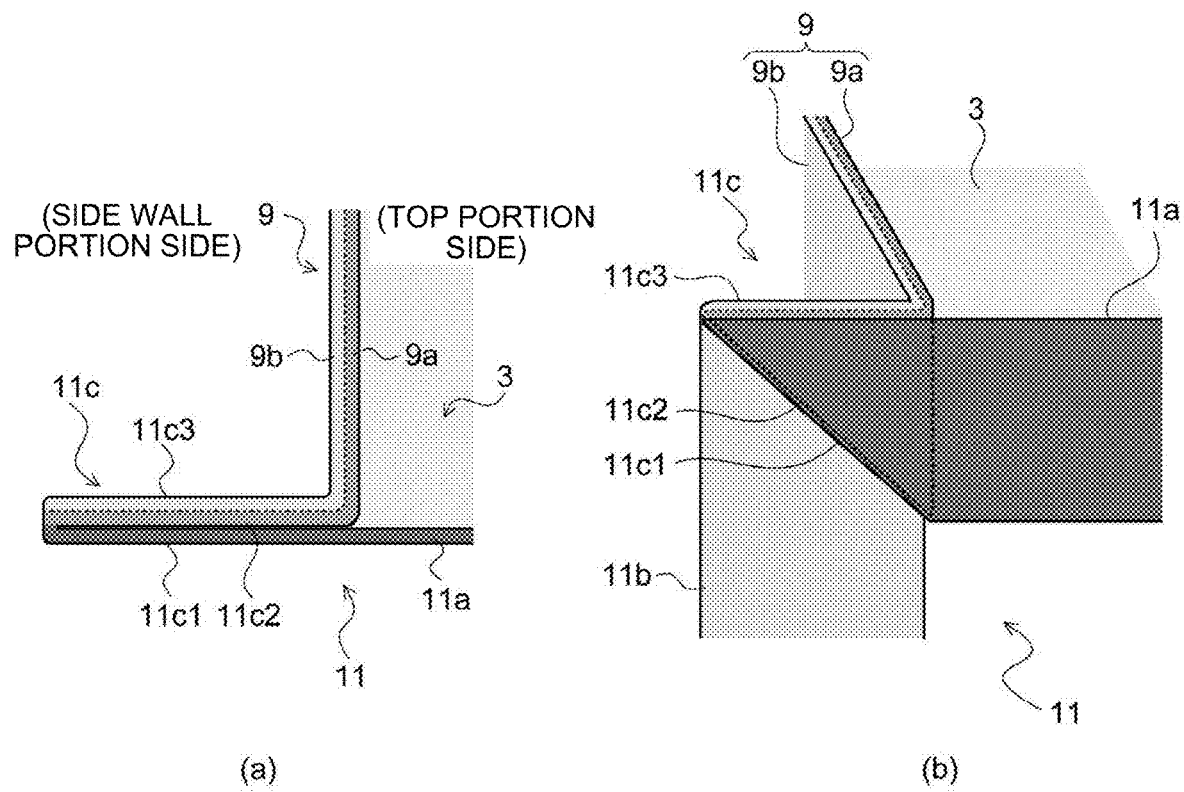
FIG. 3 is a diagram illustrating metal-sheet overlapping at a flange portion of the automotive-structural-part joint structure according to the first embodiment of the present invention ((a) top view and (b) perspective view).

As illustrated in FIG. 3, an inner side end of a site 11c1 is continuous with the flange portion adjacent to top 11a. In addition, a lower end of a site 11c3 is continuous with the flange portion adjacent to side wall 11b.

The sites 11c1 and 11c2 extended and folded from the vertical rib portion on top portion side 9a and the site 11c3 extended from the vertical rib portion on side-wall portion side 9b are triply folded at the vertical-rib flange portion 11c. Accordingly, in the flange portion 11 formed by bending the one metal sheet, the flange portion adjacent to top 11a and the flange portion adjacent to side wall 11b are continuously formed through the vertical-rib flange portion 11c.

Thus, in the joint structure 1 according to the present embodiment, it is possible to set spot welding points on each of the flange portion adjacent to top 11a, the flange portion adjacent to side wall 11b, and the vertical-rib flange portion 11c as illustrated in, for example, FIG. 2 for joining of the automotive structural part 110 and the automotive structural part 120 as exemplarily illustrated in FIG. 1. Thus, it is possible to set spot welding points on the vertical-rib flange portion 11c outside the flange portion adjacent to top 11a, and accordingly, thereby improving the stiffness of a joint portion 100 of the automotive structural part 110 and the automotive structural part 120 illustrated in FIG. 1 as compared to the conventional joint structure 81 as illustrated in FIG. 15.

Moreover, the joint structure 1 according to the present embodiment is formed by folding the one metal sheet into the flange portion adjacent to top 11a, the flange portion adjacent to side wall 11b, and the vertical-rib flange portion 11c only by bending, and is not formed through stretch flanging deformation like the corner portion at continuous flange 89c connecting the flange portion adjacent to top 89a and the flange portion adjacent to side wall 89b in the conventional joint structure 81 in FIG. 15 described above. Thus, it is possible to employ a high-strength steel sheet having low ductility in the joint structure 1, thereby improving the strength of the joint portion 100 of the automotive structural part 110 and the automotive structural part 120 as illustrated in FIG. 1.

Note that a rib height h (refer to FIG. 1) of each vertical rib portion 9 is not particularly restricted, but as the rib height increases, the area of the vertical-rib flange portion 11c connecting the flange portion adjacent to top 11a and the flange portion adjacent to side wall 11b increases, and in addition, the area of the entire flange portion 11 increases, which is preferable. In particular, when the rib height is 5 mm or higher, it is easy to have an area for resistance spot welding to the other automotive structural part 120, which is preferable.

Furthermore, in the joint structure 1 according to the present first embodiment, joining to an automotive structural part is not limited to spot welding and may be performed by any method such as mechanical joining using bolts and nuts, joining with an adhesive, or joining by other welding such as laser welding or arc welding. However, a method of performing joining at a plurality of places of the flange portion 11 by resistance spot welding takes a short time and is inexpensive, and thus is preferable. In addition, a method of performing joining by laser welding or arc welding is preferable.

Furthermore, in the vertical-rib flange portion 11c, it is preferable to join all overlapping metal sheets (the sites 11c1, 11c2, and 11c3) illustrated in FIG. 3 to the automotive structural part 120, but at least only the site 11c1, which contacts the automotive structural part 120, may be joined to the automotive structural part 120.

Moreover, the site 11c1, the site 11c2, and the site 11c3 in the vertical-rib flange portion 11c desirably closely contact each other, but do not necessarily need to closely contact each other.

Note that when the metal sheet (the site 11c1, the site 11c2, and the site 11c3) triply overlap in the vertical-rib flange portion 11c, such a problem potentially occurs that nuggets in spot welding and are unlikely to occur to all overlapping metal sheets. To avoid such a problem, a part of the metal sheet corresponding to the site 11c2 may be removed so that the site 11c2 is cut out or a hole (opening part) is provided in the joint structure according to the present invention. When the site 11c2 is cut out or a hole is provided in this manner, deformation around the removed site 11c2 is reduced because the site 11c1 and the site 11c3 are joined to the other automotive structural part, and the stiffness of the joint portion 100 (refer to FIG. 1) is improved because the site 11c1 and the site 11c3 overlap.

In addition, the thickness of the metal sheet used for the joint structure 1 according to the present embodiment is not restricted, but is preferably 0.4 mm to 6.0 mm, more preferably 0.6 mm to 4.0 mm. When the thickness is smaller than 0.4 mm, the stiffness of the joint structure 1 is low, and thus it is less advantageous to improve the stiffness of a joint portion in which automotive structural parts are joined to each other by using the joint structure according to the present invention. When the thickness is larger than 6.0 mm, a load necessary for folding of the vertical-rib flange portion is high, and thus fabrication is difficult with the capacity of a typical press machine.

Second Embodiment

Figure 4:
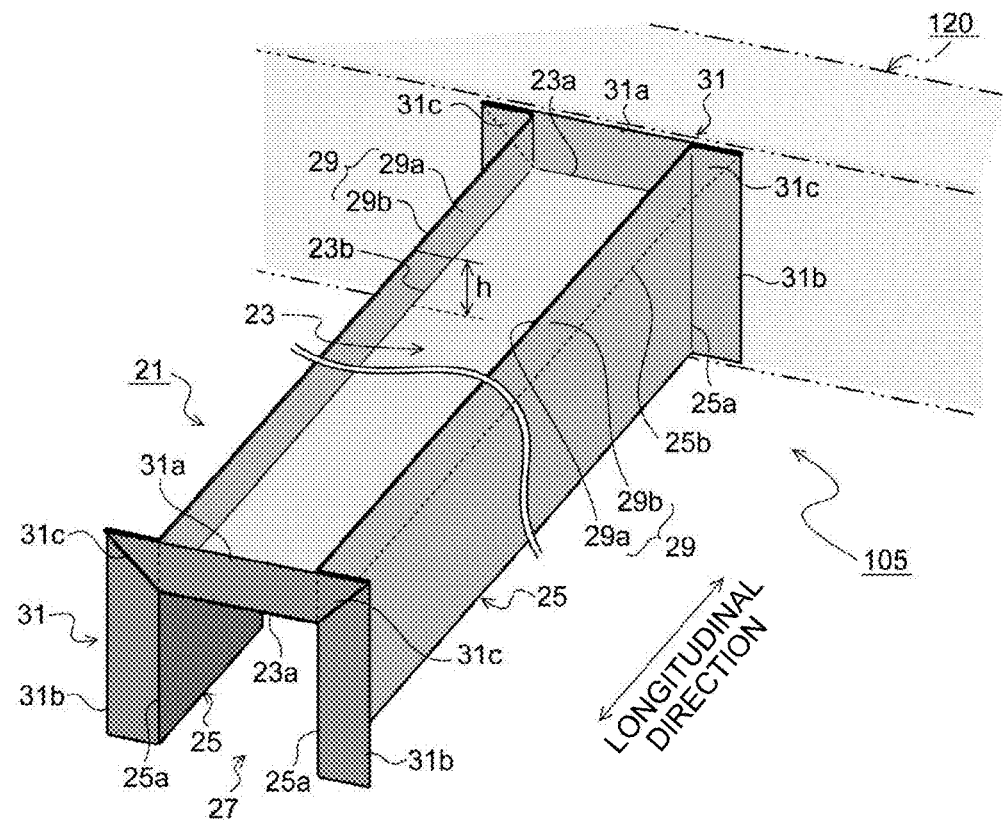
FIG. 4 is a diagram illustrating an automotive structural part according to a second embodiment of the present invention.

As illustrated in FIG. 4, an automotive structural part 21 having a joint structure according to the second embodiment of the present invention is formed by bending one metal sheet, includes a groove portion 27 including a top portion 23 and a pair of side wall portions 25, and joins an end part of the groove portion 27 in the longitudinal direction to another automotive structural part 120 in an intersecting direction. The automotive structural part 21 includes a pair of vertical rib portions 29 formed over the entire length in the longitudinal direction to stand upward from both side ends 23b of the top portion 23, and an outward-directed flange portion 31 extending outward from three side edges (a side edge 23a of the top portion 23 and side edges 25a of the pair of side wall portions 25) of the groove portion 27 on an end part side where joining to the other automotive structural part 120 occurs, the flange portion 31 being continuously formed along the three side edges.

As illustrated in FIG. 4, a vertical rib portion on top portion side 29a and a vertical rib portion on side-wall portion side 29b overlap in each vertical rib portion 29, the vertical rib portion on top portion side 29a being a part of the metal sheet bent upward and extending from the corresponding side end 23b of the top portion 23, the vertical rib portion on side-wall portion side 29b being a part of the metal sheet extending upward from an upper end 25b of the corresponding side wall portion 25.

As illustrated in FIG. 4, the flange portion 31 is constituted by a flange portion adjacent to top 31a, a flange portion adjacent to side wall 31b, and a vertical-rib flange portion 31c, the flange portion adjacent to top 31a being a part of the metal sheet bent upward and extending from the side edge 23a of the top portion 23, the flange portion adjacent to side wall 31b being a part of the metal sheet bent outward and extending from the side edge 25a of each side wall portion 25, the vertical-rib flange portion 31c being a part of the metal sheet bent outward and extending from each vertical rib portion 29.

Similarly to the joint structure 1 according to the first embodiment described above, the metal sheet is triply folded at the vertical-rib flange portion 31c with a part of the metal sheet (corresponding to the site 11c1 and the site 11c2 in FIG. 3) extended and folded from the vertical rib portion on top portion side 29a and a part of the metal sheet (corresponding to the site 11c3 in FIG. 3) extended from the vertical rib portion on side-wall portion side 29b.

Similarly to the joint structure 1 according to the first embodiment described above, in the automotive structural part 21 according to the present second embodiment, the flange portion 31 is continuously formed along the three side edges (side edge 25a, side edge 23a, and side edge 25a) of the groove portion 27 on the end part side in the longitudinal direction. Thus, joining to the other automotive structural part 120 can be achieved at spot welding points set outside the flange portion adjacent to top 31a. Accordingly, it is possible to improve the stiffness of a joint portion 105 when joining to the other automotive structural part 120 is achieved. In addition, since the automotive structural part 21 is formed only by bending of one metal sheet, it is possible to employ a high-strength steel sheet having low ductility, thereby improving the strength of the joint portion 105 formed through joining to the other automotive structural part 120.

Furthermore, in the automotive structural part 21, each vertical rib portion 29 is formed over the entire length in the longitudinal direction between the top portion 23 and the corresponding side wall portion 25. Thus, it is possible to improve the axial crush strength of the automotive structural part 21 against a collision load input in the longitudinal direction.

A rib height h of each vertical rib portion 29 in the automotive structural part 21 is not particularly restricted, but as the rib height increases, the area of the vertical-rib flange portion 31c connecting the flange portion adjacent to top 31a and the flange portion adjacent to side wall 31b increases, and in addition, the area of the entire flange portion 31 increases, which is preferable because the strength of joining is improved. In particular, when the rib height is 5 mm or higher, it is easy to have an area for resistance spot welding to the other automotive structural part 120, which is preferable.

Note that joining of the automotive structural part 21 according to the present second embodiment and the other automotive structural part 120 is not limited to spot welding and may be performed by any method such as mechanical joining using bolts and nuts, joining with an adhesive, or joining by welding. However, a method of performing joining at a plurality of places of the flange portion by resistance spot welding takes a short time and is inexpensive, and thus is preferable. In addition, a method of performing joining by laser welding or arc welding is preferable.

In the vertical-rib flange portion 31c, it is preferable to join all overlapping metal sheets (corresponding to the site 11c1, the site 11c2, and the site 11c3 in FIG. 3) to the other automotive structural part 120, but at least only a part of the metal sheet (corresponding to the site 11c1 in FIG. 3) that contacts the other automotive structural part 120 may be joined.

Moreover, sites (corresponding to the site 11c1, the site 11c2, and the site 11c3 in FIG. 3) where the metal sheet is folded at the vertical-rib flange portion 31c desirably closely contact each other, but do not necessarily need to closely contact each other.

Furthermore, when the vertical-rib flange portion 31c includes a site where the metal sheet is triply folded, such a problem potentially occurs that nuggets in spot welding are unlikely to occur to all overlapping metal sheets. To avoid such a problem, a triply folded part of the metal sheet (corresponding to the site 11c2 in FIG. 3) at the vertical-rib flange portion 31c may be removed so that the part of the metal sheet is cut out or a hole (opening part) is provided in the automotive structural part according to the present invention.

When a part (site corresponding to the site 11c2 illustrated in FIG. 3) of the vertical-rib flange portion 31c is cut out or a hole is provided in this manner, deformation around the removed part of the metal sheet is reduced because other parts of the metal sheet (corresponding to the site 11c1 and the site 11c3 in FIG. 3) at the vertical-rib flange portion 31c are joined to the other automotive structural part 120, and stiffness is improved because the remaining part of the metal sheet is folded.

In addition, the thickness of the metal sheet used for the automotive structural part 21 according to the present embodiment is not restricted, but is preferably 0.4 mm to 6.0 mm, more preferably 0.6 mm to 4.0 mm. When the thickness is smaller than 0.4 mm, the stiffness of the automotive structural part 21 is low, and thus it is less advantageous to improve the stiffness of the joint portion 105 in which the automotive structural part 21 according to the present invention and the other automotive structural part 120 are joined to each other. When the thickness is larger than 6.0 mm, a load necessary for bending of the vertical-rib flange portion 31c is high, and thus fabrication is difficult with the capacity of a typical press machine.

Third Embodiment

<Method of Manufacturing Automotive-Structural-Part Joint Structure>

Subsequently, an automotive-structural-part manufacturing method according to the third embodiment of the present invention will be described below. The automotive-structural-part manufacturing method according to the present third embodiment manufactures the automotive structural part 21 illustrated as an example in FIG. 4 by bending one metal sheet and includes a pre-bending process, a first bending process, and a second bending process. Each above-described process will be described below based on FIGS. 5 to 10. Note that FIGS. 5 to 10 illustrate only an end part side of the automotive structural part 21 where joining to the other automotive structural part 120 occurs, and omit the first groove portion 27 for sake of simplicity.

<<Pre-Bending Process>>

Figure 5:
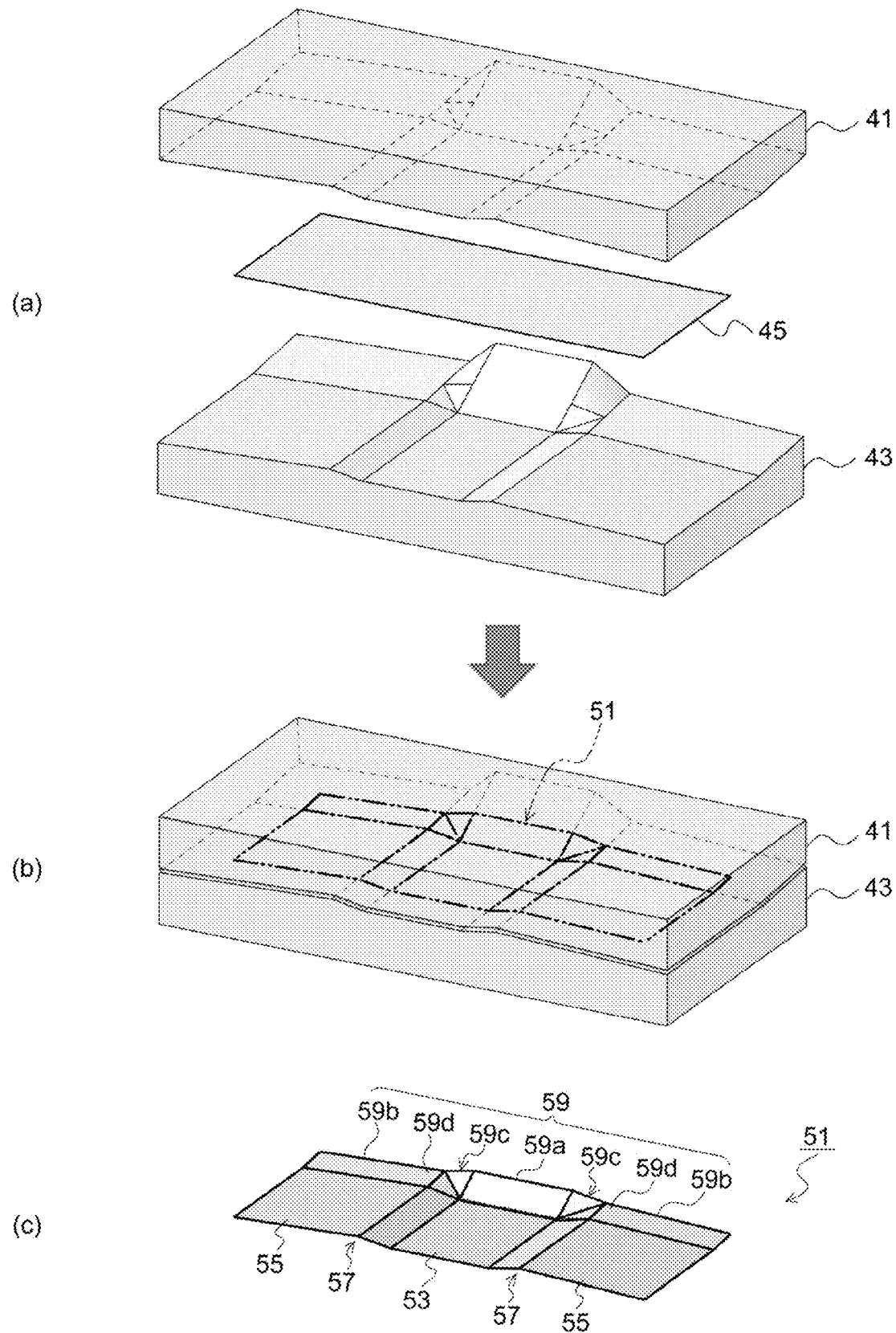
FIG. 5 is a diagram illustrating a pre-bending process of an automotive-structural-part manufacturing method according to a third embodiment of the present invention ((a) before start of the pre-bending process, (b) end of the pre-bending process, and (c) pre-bending product).
Figure 6:
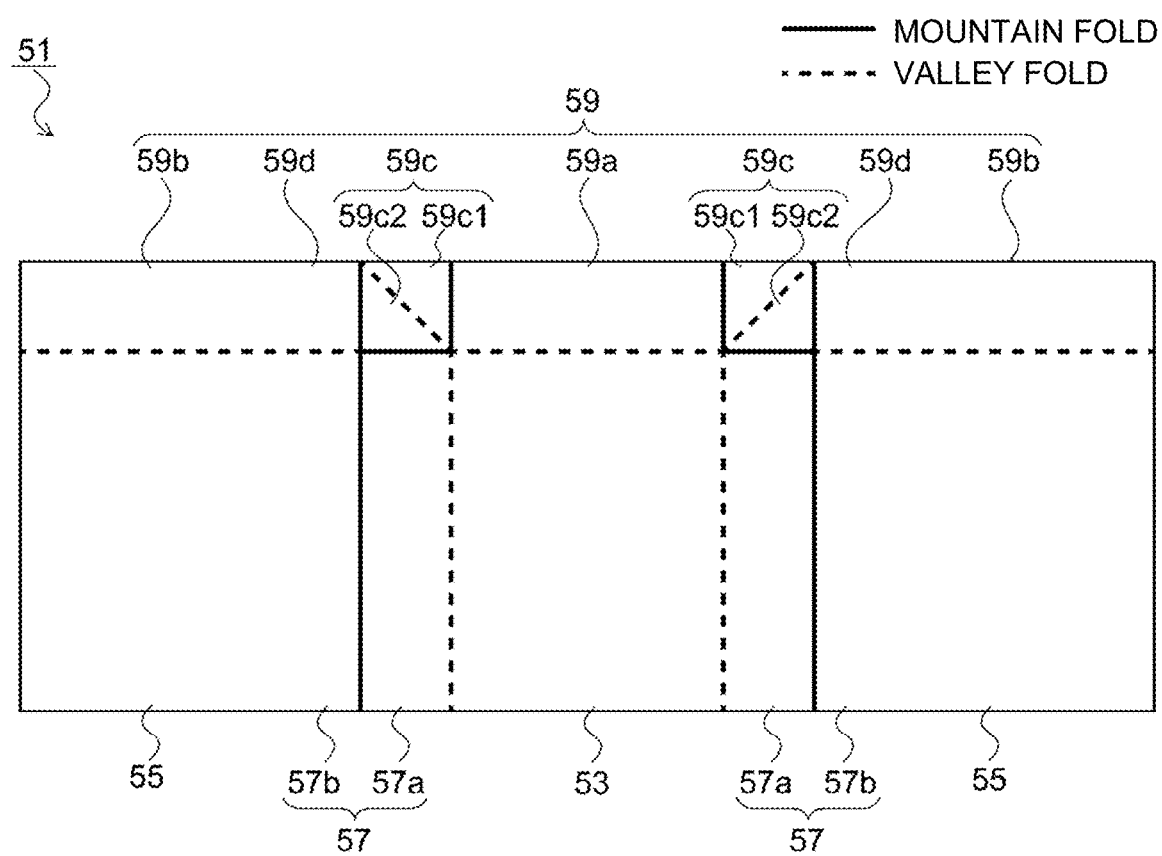
FIG. 6 is a diagram illustrating fold lines provided to a metal sheet through the pre-bending process of the automotive-structural-part manufacturing method according to the third embodiment of the present invention (solid line: mountain fold line, and dashed line: valley fold line).

As illustrated as an example in FIGS. 5 and 6, the pre-bending process is a process that forms a pre-bending product 51 by providing fold lines of mountain fold (solid lines in FIG. 6) and valley fold (dashed lines in FIG. 6) to a metal sheet 45 by using an upper mold 41 and a lower mold 43.

As illustrated in FIGS. 5 (c) and 6, the pre-bending product 51 includes a portion corresponding to top 53 corresponding to the top portion 23 of the automotive structural part 21 (refer to FIG. 4), a portion corresponding to side wall 55 corresponding to each side wall portion 25, a portion corresponding to vertical rib 57 corresponding to each vertical rib portion 29, and a portion corresponding flange 59 corresponding to the flange portion 31.

As illustrated in FIG. 6, the portion corresponding to vertical rib 57 includes a top portion corresponding to vertical rib 57a extending from the portion corresponding to top 53, and a side-wall portion corresponding to vertical rib 57b extending from the portion corresponding to side wall 55. In addition, a fold line of valley fold is provided at the boundary between the portion corresponding to top 53 and the top portion corresponding to vertical rib 57a, and a fold line of mountain fold is provided at the boundary between the top portion corresponding to vertical rib 57a and the side-wall portion corresponding to vertical rib 57b.

As illustrated in FIGS. 5 (c) and 6, the portion corresponding flange 59 includes a portion corresponding to flange adjacent to top 59a extending from the portion corresponding to top 53, a portion corresponding to flange adjacent to side wall 59b extending from the portion corresponding to side wall 55, and a portion corresponding flange adjacent to vertical rib 59c and a portion corresponding flange adjacent to vertical rib 59d that extend from the portion corresponding to vertical rib 57. Note that the portion corresponding flange adjacent to vertical rib 59c is a region of a substantially rectangular shape, and three sides thereof are continuous with the top portion corresponding to vertical rib 57a, the portion corresponding to flange adjacent to top 59a, and the portion corresponding flange adjacent to vertical rib 59d, respectively.

In addition, fold lines of valley fold are provided at the boundary between the portion corresponding to top 53 and the portion corresponding to flange adjacent to top 59a and the boundary between the portion corresponding to side wall 55 and the portion corresponding to flange adjacent to side wall 59b. Furthermore, fold lines of mountain fold are provided at the boundary between the top portion corresponding to vertical rib 57a and the portion corresponding flange adjacent to vertical rib 59c, the boundary between the portion corresponding to flange adjacent to top 59a and the portion corresponding flange adjacent to vertical rib 59c, and the boundary between the portion corresponding flange adjacent to vertical rib 59c and the portion corresponding flange adjacent to vertical rib 59d. Moreover, as illustrated in FIG. 6, the portion corresponding flange adjacent to vertical rib 59c, to which a fold line of valley fold is provided, is divided into two, namely, a site 59c1 continuous with the portion corresponding to flange adjacent to top 59a, and a site 59c2 continuous with the top portion corresponding to vertical rib 57a and the portion corresponding flange adjacent to vertical rib 59d.

<<First Bending Process>>

Figure 7:
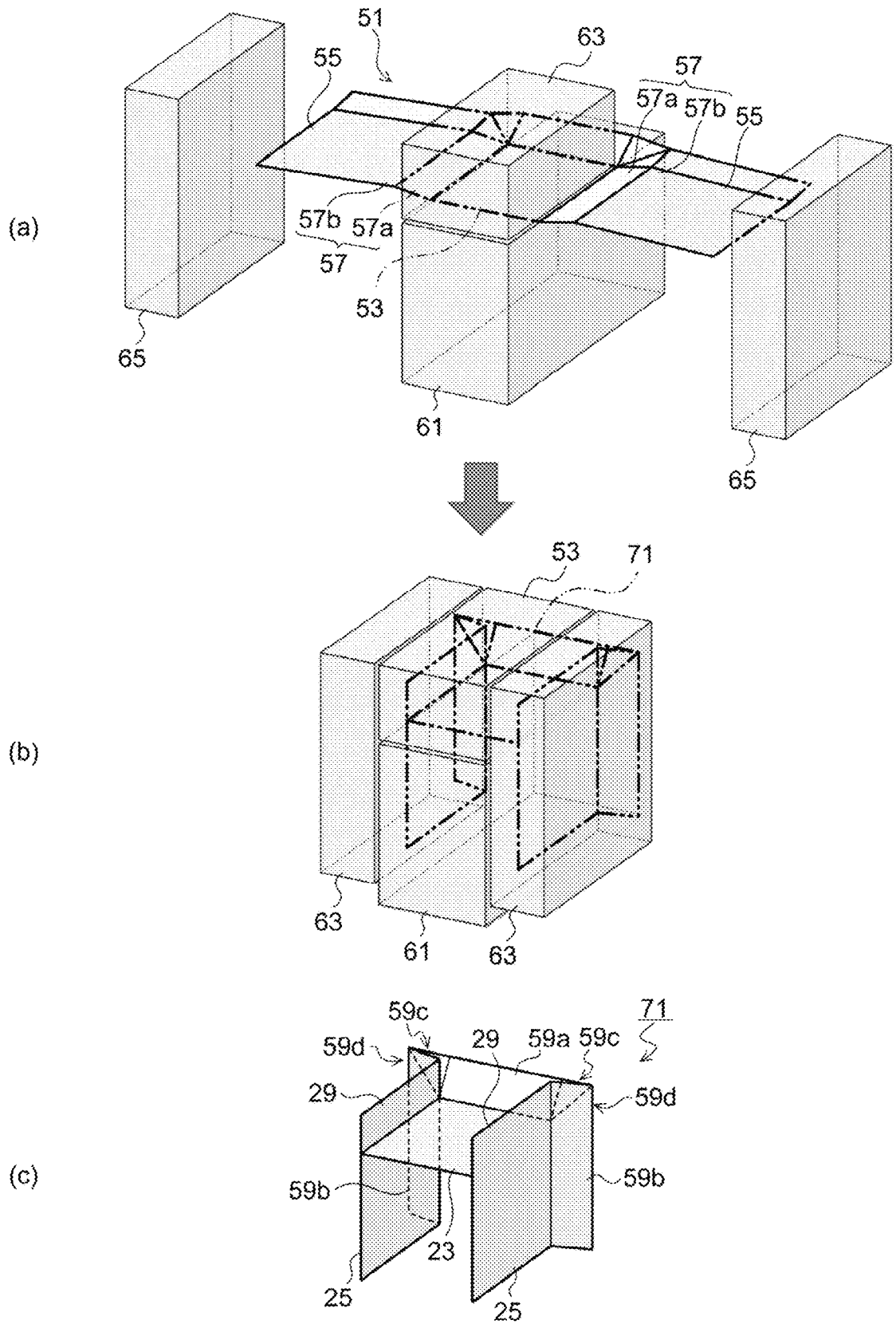
FIG. 7 is a diagram illustrating a first bending process of the automotive-structural-part manufacturing method according to the third embodiment of the present invention ((a) before start of the first bending process, (b) end of the first bending process, and (c) intermediate product) (part 1).
Figure 8:
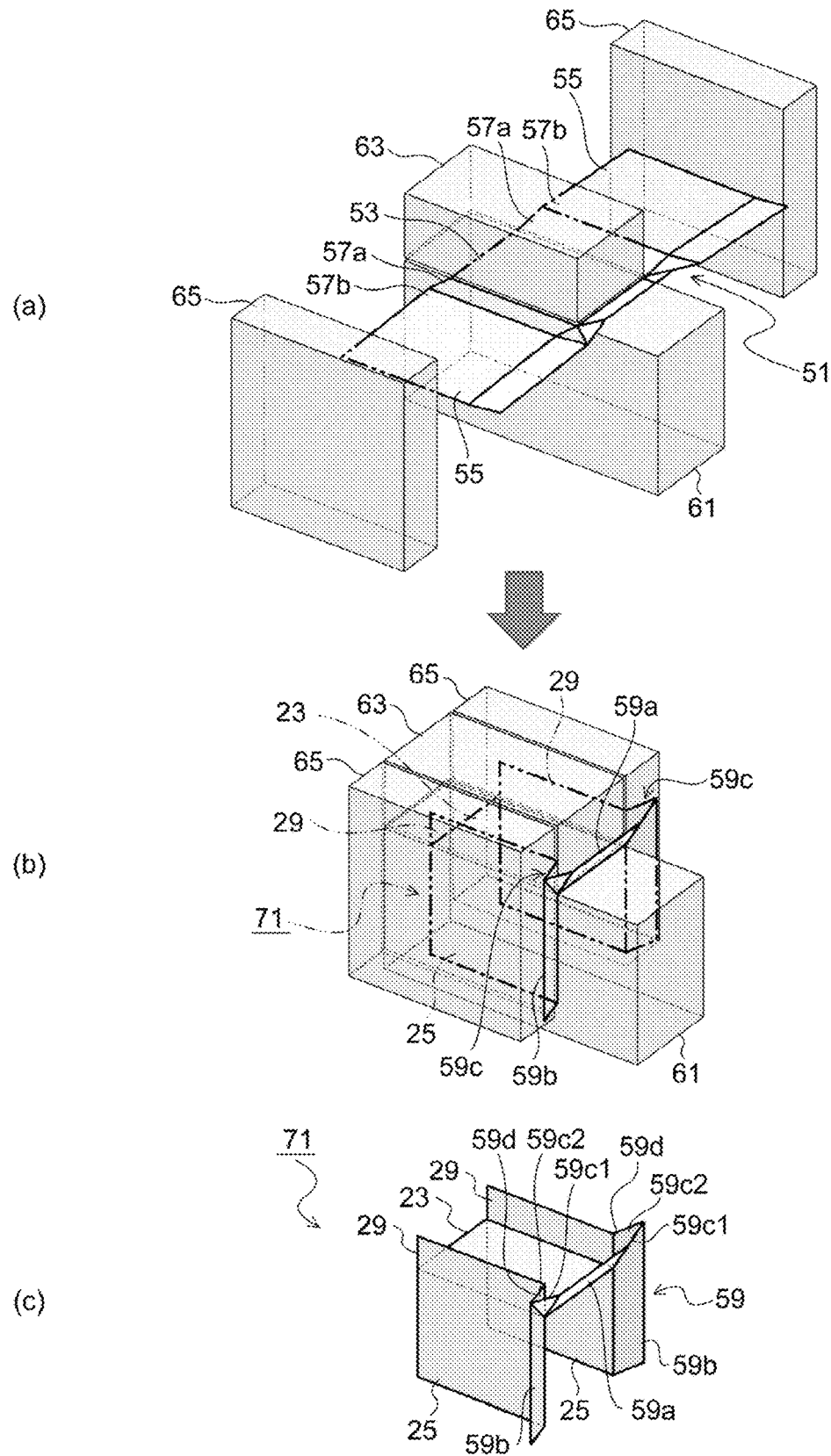
FIG. 8 is a diagram illustrating the first bending process of the automotive-structural-part manufacturing method according to the third embodiment of the present invention ((a) before start of the first bending process, (b) end of the first bending process, and (c) intermediate product) (part 2).

As illustrated in FIGS. 7 and 8, the first bending process is a process at which a punch 61, a pad 63, and a pair of first cams 65 are used to perform bending into an intermediate product 71 including the top portion 23, each side wall portion 25, and each vertical rib portion 29 by bending the portion corresponding to vertical rib 57 of the pre-bending product 51, which is formed through the pre-bending process, with the corresponding first cam 65, the punch 61, and the pad 63 while the portion corresponding to top 53 of the pre-bending product 51 is sandwiched by the punch 61 and the pad 63.

At the first bending process, each vertical rib portion 29 is formed by folding the top portion corresponding to vertical rib 57a and the side-wall portion corresponding to vertical rib 57b of the portion corresponding to vertical rib 57 along the fold lines provided to the pre-bending product 51 through the pre-bending process. Along with formation of the vertical rib portion 29, the portion corresponding flange adjacent to vertical rib 59c and the portion corresponding flange adjacent to vertical rib 59d extending from the portion corresponding to vertical rib 57 are folded.

Then, in the process of sandwiching the portion corresponding to side wall 55 and the portion corresponding to vertical rib 57 by the corresponding first cam 65, the punch 61, and the pad 63, the portion corresponding to flange adjacent to top 59a is bent upward, the portion corresponding to flange adjacent to side wall 59b is bent outward, and the site 59c2 is valley-folded toward the site 59c1 side (refer to FIGS. 8 (c) and 6).

However, when the portion corresponding to flange adjacent to top 59a and the portion corresponding to flange adjacent to side wall 59b are bent outward and the folded portion corresponding flange adjacent to vertical rib 59c is bent outward together with the portion corresponding flange adjacent to vertical rib 59d along with formation of the side wall portion 25 and the vertical rib portion 29 through the first bending process, none of the bending leads to formation of the flange portion adjacent to top 31a, the flange portion adjacent to side wall 31b, and the vertical-rib flange portion 31c of the target automotive structural part 21 illustrated in FIG. 4.

<<Second Bending Process>>

Figure 9:
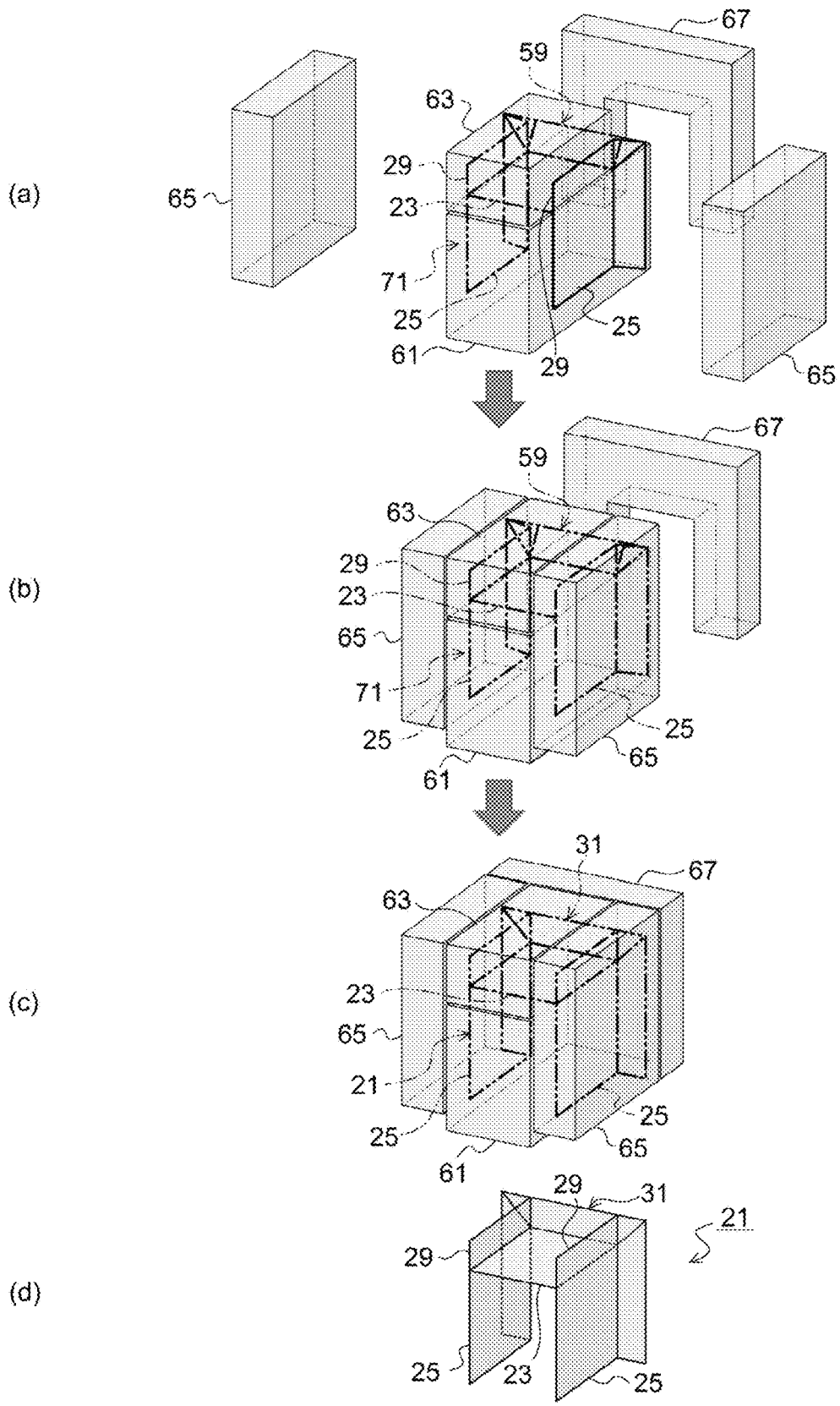
FIG. 9 is a diagram illustrating a second bending process of the automotive-structural-part manufacturing method according to the third embodiment of the present invention ((a) before start of the first bending process, (b) before start of the second bending process, (c) end of the second bending process, and (d) end part of a target automotive structural part) (part 1).
Figure 10:
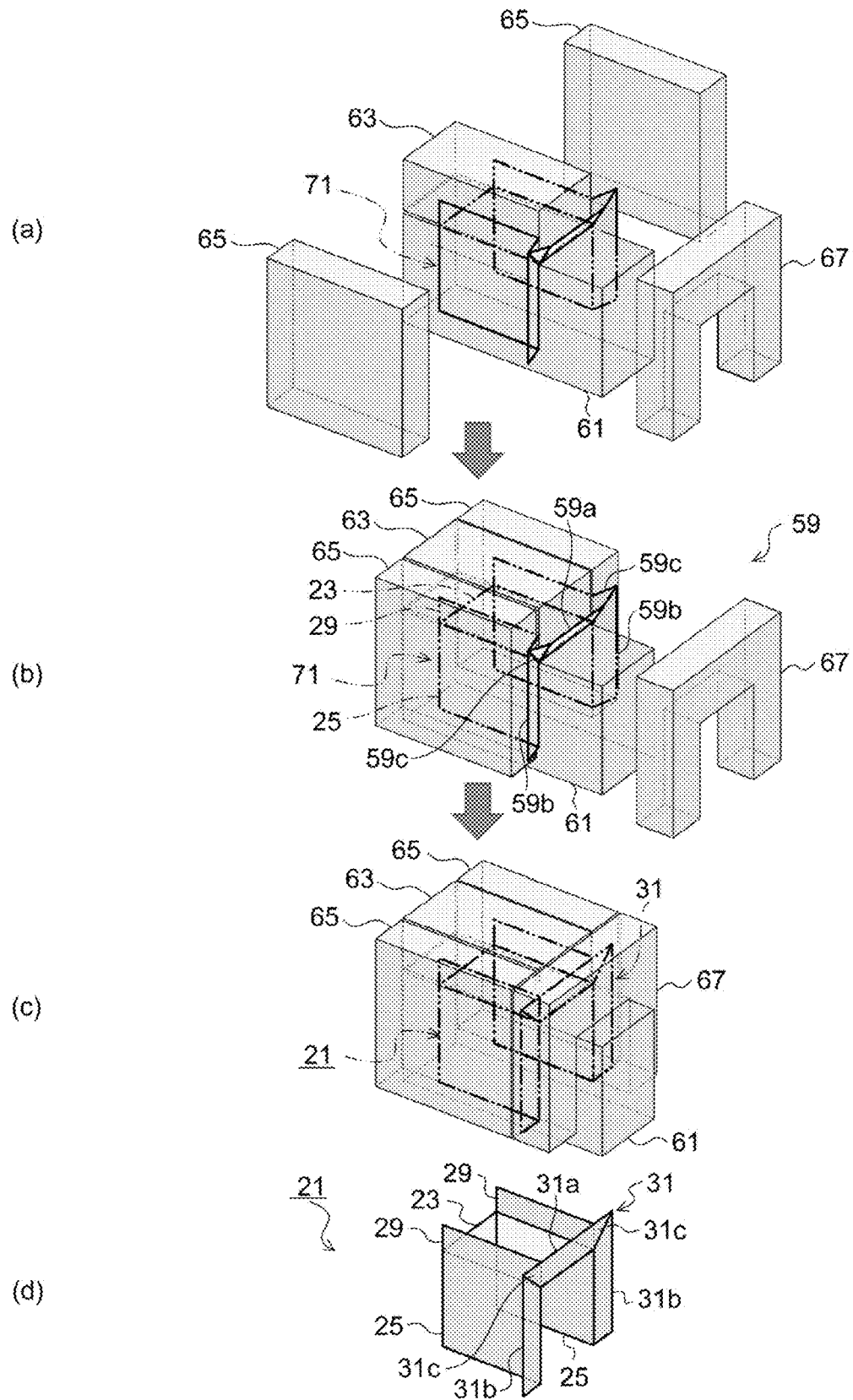
FIG. 10 is a diagram illustrating the second bending process of the automotive-structural-part manufacturing method according to the third embodiment of the present invention ((a) before start of the first bending process, (b) before start of the second bending process, (c) end of the second bending process, and (d) end part of the target automotive structural part) (part 2).

As illustrated in FIGS. 9 and 10, the second bending process is a process at which a second cam 67 disposed on the end part side of the punch 61 and the pad 63 where joining to the other automotive structural part 120 (refer to FIG. 4) occurs and capable of moving toward the punch 61 and the pad 63 is additionally used to form the flange portion 31 by moving the second cam 67 toward the punch 61 and the pad 63 to bend the portion corresponding flange 59 of the intermediate product 71 while the top portion 23 of the intermediate product 71 is sandwiched by the punch 61 and the pad 63, and the side wall portions 25 and the vertical rib portions 29 of the intermediate product 71 are sandwiched by the punch 61, the pad 63, the corresponding first cam 65.

Specifically, as illustrated in FIG. 10, as the second cam 67 is moved toward the punch 61 and the pad 63, on the end part side of the intermediate product 71 where joining to the other automotive structural part 120 (refer to FIG. 4) occurs, the portion corresponding to flange adjacent to top 59a as a part of the metal sheet extending from the top portion 23 is bent upward to form the flange portion adjacent to top 31a, each portion corresponding to flange adjacent to side wall 59b as a part of the metal sheet extending from the corresponding side wall portion 25 is bent outward to form the flange portion adjacent to side wall 31b, and each portion corresponding flange adjacent to vertical rib 59c as a part of the metal sheet extending from the corresponding vertical rib portion 29 is valley-folded along a fold line to fold the site 59c1 and the site 59c2 (refer to FIG. 6) and overlapped with the portion corresponding flange adjacent to vertical rib 59d (refer to FIG. 6) to form the vertical-rib flange portion 31c.

Accordingly, the flange portion 31, in which the flange portion adjacent to top 31a and the flange portion adjacent to side wall 31b are continuous with each other through the vertical-rib flange portion 31c along the three side edges (side edge 25a, side edge 23a, and side edge 25a; refer to FIG. 4) of the groove portion 27, is formed.

With the automotive-structural-part manufacturing method according to the present third embodiment, since the flange portion adjacent to top 31a extending from the top portion 23, each flange portion adjacent to side wall 31b extending from the corresponding side wall portion 25, and each vertical-rib flange portion 31c extending from the corresponding vertical rib portion 29 are formed only by bending, it is possible to prevent generation of fracture due to stretch flanging deformation, unlike each corner portion at continuous flange 89c connecting the flange portion adjacent to top 89a and the corresponding flange portion adjacent to side wall 89b in the above-described conventional joint structure 81 (refer to FIG. 15). Thus, with the automotive-structural-part manufacturing method according to the present third embodiment, it is possible to use various metal sheets irrespective of strength. In particular, it is possible to use a high-strength steel sheet having a tensile strength of 590 MPa grade or higher, an ultra-high strength steel sheet of 980 MPa grade or higher, and metal sheets such as a stainless steel sheet, an aluminum sheet, a magnesium sheet, and a titanium sheet, which all have poor ductility.

Moreover, with the automotive-structural-part manufacturing method according to the present third embodiment, since each vertical rib portion 29 is formed between the top portion 23 and the corresponding side wall portion 25 by folding a metal sheet, it is possible to manufacture the automotive structural part 21 having excellent axial crush strength against a load input in an axial direction and excellent strength against 3-point bending deformation.

Note that, in the above description, the pre-bending product 51 in which fold lines are provided to the metal sheet 45 is formed through the pre-bending process before the first bending process, and since fold lines are provided through the pre-bending process, it is possible to stabilize fold positions in bending through the subsequent first bending process and second bending process. However, the present invention may form the intermediate product 71 by directly bending a metal sheet of a flat plate shape through the first bending process without the pre-bending process.

In the automotive-structural-part manufacturing method according to the present invention, press forming (cold-press forming) in a room-temperature environment is preferable since it is inexpensive. However, the metal sheet may be heated in press forming (hot-press forming or warm-press forming) to increase the accuracy of a press load at bending and the shape dimensions of a target automotive structural part. When a steel sheet is used as the metal sheet, the steel sheet can be heated to a temperature higher than the Ac3 transformation point, for example, 910° C. or higher so that quenching occurs as the metal sheet is cooled by molds used at the pre-bending process, the first bending process, and the second bending process, and accordingly, an advantage of improving the strength of the metal sheet is obtained.

Furthermore, it is possible to achieve joining to the other automotive structural part 120 at spot welding points set on the vertical-rib flange portion 31c outside the flange portion adjacent to top 31a since each outward-directed flange portion 31 is formed to be continuous along the three side edges (side edge 25a, side edge 23a, and side edge 25a) of the groove portion 27 on the end part side where joining to the other automotive structural part 120 (refer to FIG. 4) occurs. Accordingly, it is possible to improve the stiffness of the joint portion 105 (refer to FIG. 4) when joining to the other automotive structural part 120 is achieved.

Moreover, the axial crush strength of the automotive structural part 21 against a collision load input in the longitudinal direction improves since the automotive-structural-part manufacturing method according to the present third embodiment forms each vertical rib portion 29 over the entire length in the longitudinal direction between the top portion 23 and the corresponding side wall portion 25. In addition, with the automotive-structural-part manufacturing method according to the present third embodiment, since it is possible to manufacture the automotive structural part only by bending of one metal sheet, no scrap due to a cutout or a hole provided to prevent stretch flanging deformation is generated, and thus an excellent yield is obtained.

In the automotive-structural-part manufacturing method according to the present invention, sites (corresponding to the sites 11c1, 11c2, and 11c3 in FIG. 4) where the metal sheet is folded at each vertical-rib flange portion 31c desirably closely contact each other but are not limited to close contact.

Furthermore, since each vertical-rib flange portion 31c is formed by folding sites (corresponding to the site 59c1 and the site 59c2 illustrated in FIG. 6) extending from the corresponding vertical rib portion 29, the height and width of the vertical-rib flange portion 31c may be determined in accordance with the rib height h (refer to FIG. 4) of the vertical rib portion 29. However, through the second bending process illustrated in FIG. 8, the vertical-rib flange portion 31c may be formed by stretching and deforming the portion corresponding flange adjacent to vertical rib 59c and the portion corresponding flange adjacent to vertical rib 59d extending from the portion corresponding to vertical rib 57. Thus, the height and width of the vertical-rib flange portion 31c do not necessarily need to be determined by the rib height of the vertical rib portion 29 but may be set as appropriate.

Moreover, when the automotive structural part 21 in which the angle between the top portion 23 and each side wall portion 25 is different is manufactured, any difference of 20° or smaller in the angle between the top portion 23 and the side wall portion 25 can be dealt with through elongation and shrink of the metal sheet in the process of forming the vertical-rib flange portion 31c without changing the shape of the vertical-rib flange portion 31c.

Note that although the vertical-rib flange portion 31c is formed by triply folding the metal sheet in the above description, such a problem potentially occurs that nuggets in spot welding are unlikely to occur to all overlapping metal sheets when the vertical-rib flange portion formed by triply folding the metal sheet is joined to the other automotive structural part. To avoid such a problem, the site 59c2 in the portion corresponding flange adjacent to vertical rib 59c of the metal sheet 45 or the pre-bending product 51 may be removed by cutting out or providing a hole in advance before the intermediate product 71 is formed through the first bending process, so that the metal sheet is doubly folded at the vertical-rib flange portion 31c of the automotive structural part 21.

When a part of the metal sheet at the vertical-rib flange portion 31c is removed in this manner, deformation around the removed part of the metal sheet at the vertical-rib flange portion 31c is reduced because the remaining part of the metal sheet (corresponding to the site 11c1 and the site 11c3 in FIG. 3) is joined to the other automotive structural part 120, and stiffness is improved because the remaining part of the metal sheet is folded.

Note that means for removing the metal sheet 45 or the pre-bending product 51 to prevent triple folding of the metal sheet may be any means such as punching by a mold punch or fusing by a laser.

Furthermore, the thickness of the metal sheet used for the automotive-structural-part manufacturing method according to the present third embodiment is not restricted, but is preferably 0.4 mm to 6.0 mm, more preferably 0.6 mm to 4.0 mm. When the thickness is smaller than 0.4 mm, the stiffness of the manufactured automotive structural part 21 is low, and thus it is less advantageous to improve the stiffness of the joint portion 105 (refer to FIG. 4) formed by joining to the other automotive structural part 120. When the thickness is larger than 6.0 mm, a load necessary for bending of the vertical-rib flange portion 31c at the first bending process and the second bending process is high, and thus fabrication is difficult with the capacity of a typical press machine.

First Example

Specific experiments were performed to check effects of the present invention, and results thereof will be described below. In the first example, stiffness was evaluated by a torsion test in which a specimen 130 illustrated in FIG. 11 was a test target.

<Test Materials and Component Shapes>

Figure 11:
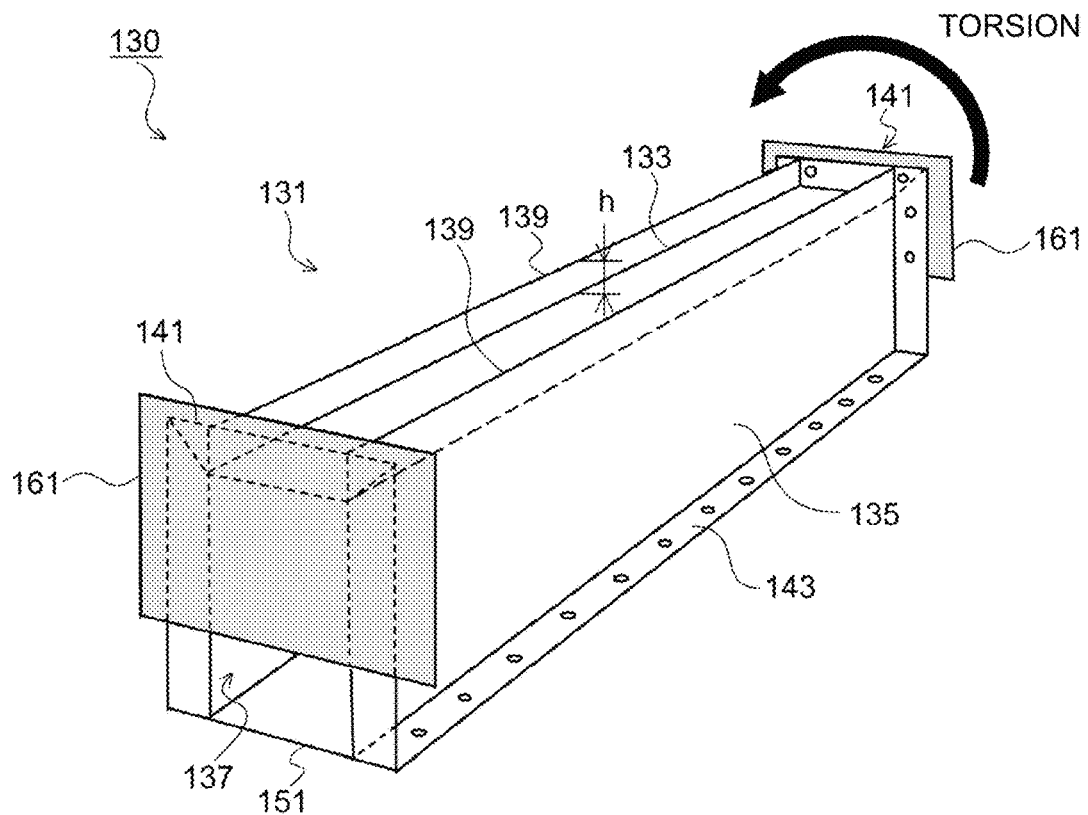
FIG. 11 is a diagram illustrating a specimen used for a torsion test according to a first example and a direction in which torsion torque is applied in the torsion test.

As illustrated in FIG. 11, the specimen 130 was produced by joining an automotive structural part 131 simulated as a cross member of an automotive body and a component 151 simulated as a floor panel by spot welding. A test material of the automotive structural part 131 was a galvannealed steel sheet having a thickness of 1.6 mm and a tensile strength of 1180 MPa grade, and a test material of the component 151 was a mild steel sheet having a thickness of 0.6 mm and a tensile strength of 270 MPa grade. Table 1 lists material properties of the galvannealed steel sheet as the test material of the automotive structural part 131.

TABLE 1

| Material | Thickness (mm) | YP | TS | EI |
| --- | --- | --- | --- | --- |
| 1180 MPa Grade | 1.6 | 870 | 1250 | 13 |

The automotive structural part 131 includes a groove portion 137 including a top portion 133 and a pair of side wall portions 135, and includes a vertical rib portion 139 connecting the top portion 133 and the corresponding side wall portion 135, and an outward-directed flange portion 141 continuously formed along three side edges at an end part of the groove portion 137 in the longitudinal direction. In addition, the automotive structural part 131 includes a flange portion 143 welded to the component 151 at a lower end of each side wall portion 135. Note that the vertical rib portion 139 had a rib height h of 20 mm.

<Torsion Test>

As illustrated in FIG. 11, a torsion test in which torsion torque was applied to an end part of the specimen 130 in the axial direction was performed, and the stiffness of the automotive structural part 131 was evaluated based on a torsion angle of the flange portion 141 of the automotive structural part 131. In the torsion test, the flange portion 141 on each end side of the automotive structural part 131 was joined to a rigid body wall 161 simulated as a side sill, and the torsion angle was measured when torsion torque of 400 kN/mm was applied to the flange portion 141 on the one end side while the other end side was fixed.

In the present first example, an invention example was the specimen 130 using the automotive structural part 131 according to the present invention. In addition, as a comparison target, a conventional example was a specimen using an automotive structural part (not illustrated) that includes no vertical rib portion, includes a "flange portion adjacent to top" continuous with a top portion and a "flange portion adjacent to side wall" continuous with a side wall portion, and includes no corner portion at continuous flange connecting the flange portion adjacent to top and the flange portion adjacent to side wall, similarly to the above-described conventional joint structure 81 (FIG. 15). In addition, a comparative example was a specimen using an automotive structural part (not illustrated) that includes a vertical rib portion between a top portion and a side wall portion but includes no corner portion at continuous flange connecting a flange portion adjacent to top and a flange portion adjacent to side wall.

Then, the torsion angle was measured for each of the specimens according to the conventional example and the comparative example by performing the torsion test under a condition same as that of the invention example. Note that, similarly to the automotive structural part 131 according to the invention example, the vertical rib portion of the automotive structural part according to the comparative example had a rib height of 20 mm.

Figure 12:
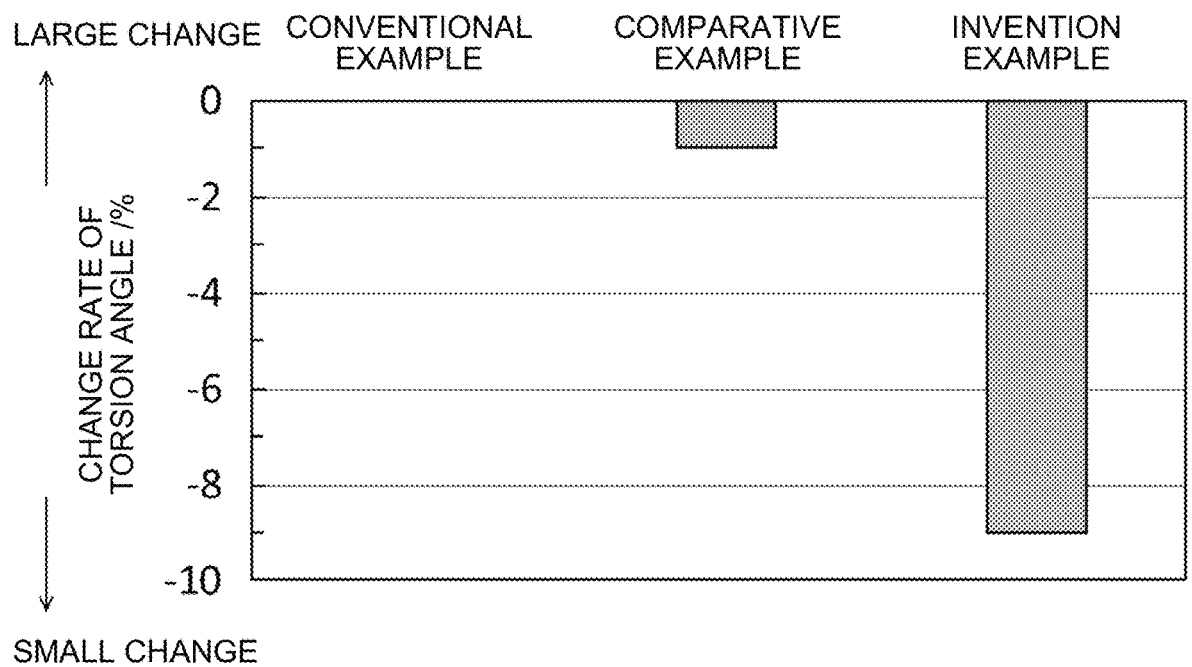
FIG. 12 is a diagram illustrating results of the change rate of a torsion angle obtained by the torsion test according to the first example.

FIG. 12 illustrates results of the change rate of the torsion angle in the comparative example and the invention example with reference to the torsion angle in the conventional example. The change rate of the torsion angle was calculated by the equation below.

> The change rate (%) of the torsion angle=((the torsion angle in the invention example or the comparative example)−(the torsion angle in the conventional example))/(the torsion angle in the conventional example)×100

In FIG. 12, the result of the comparative example including only vertical rib portions indicates that the change rate of the torsion angle was −1% approximately and the torsion angle was slightly smaller than that of the conventional example including neither a vertical rib portion nor a corner portion at continuous flange. This is because the polar moment of inertia of area increased and the stiffness improved since the vertical rib portions were provided in the automotive structural part according to the comparative example.

In the invention example including, in addition to the vertical rib portions 29, each vertical-rib flange portion 31c connecting the flange portion adjacent to top 31a and the flange portion adjacent to side wall 31b, the change rate of the torsion angle was −9% approximately and the torsion angle was significantly smaller than those of the conventional example and the comparative example. This verifies that the stiffness of the automotive structural part 131 according to the invention example has significantly improved.

Second Example

Figure 13:
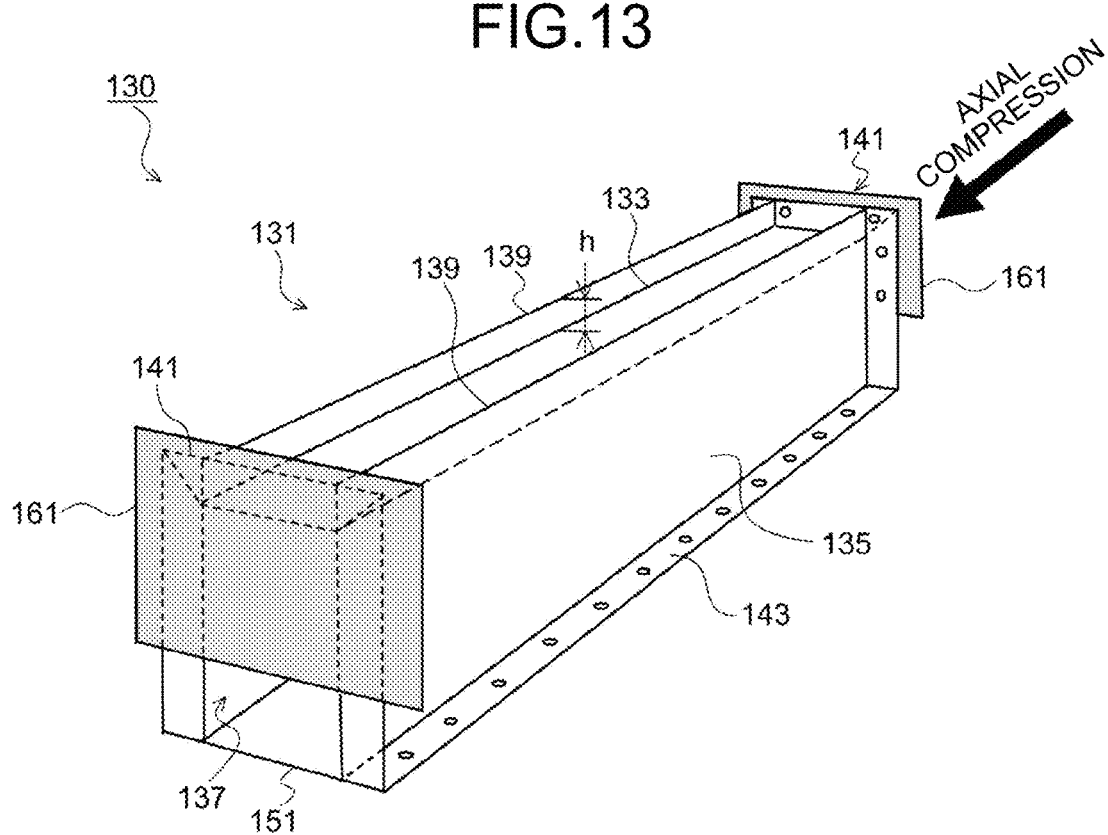
FIG. 13 is a diagram illustrating a specimen used for an axial crush test according to a second example and a direction in which a load is applied to cause axial crush in the axial crush test.

Subsequently, the specimen 130 illustrated in FIG. 13 was a test target, and an axial crush test in which compression was caused by inputting a load in the longitudinal direction was performed to evaluate strength at side collision.
<Test Materials and Component Shapes>
Similarly to the first example described above, the specimen 130 illustrated in FIG. 13 was produced by joining the automotive structural part 131 simulated as a cross member of an automotive body and the component 151 simulated as a floor panel by spot welding. In addition, test materials of the automotive structural part 131 and the component 151 were same as those in the first example described above.
<Axial Crush Test>
As illustrated in FIG. 13, the axial crush test in which a load was input to the end part of the specimen 130 in the axial direction was performed to calculate collision absorption energy in an axial crush process, thereby evaluating the strength of the automotive structural part 131. In the axial crush test, the flange portion 141 on each end side of the automotive structural part 131 was joined to the rigid body wall 161 simulated as a side sill, and a load was input to the one end side while the other end side was fixed. Then, while a length by which the specimen 130 was crushed by inputting a load was set to be 50 mm, the collision absorption energy of the specimen 130 was calculated from the crushing length and the value of the load in the crushing process.

In the second example, influence of the rib height on the collision absorption energy of the automotive structural part 131 according to the present invention was examined by changing the rib height h of the vertical rib portion 139 in the range of 1 mm to 20 mm.

In addition, in the second example, as a comparison target, a conventional example was a specimen using an automotive structural part (not illustrated) (with the rib height h set to be 0 mm) including neither a vertical rib portion nor a corner portion at continuous flange connecting a flange portion adjacent to top and a flange portion adjacent to side wall, similarly to the conventional joint structure 81 (refer to FIG. 15), and the axial crush test was performed to calculate the collision absorption energy.

Figure 14:
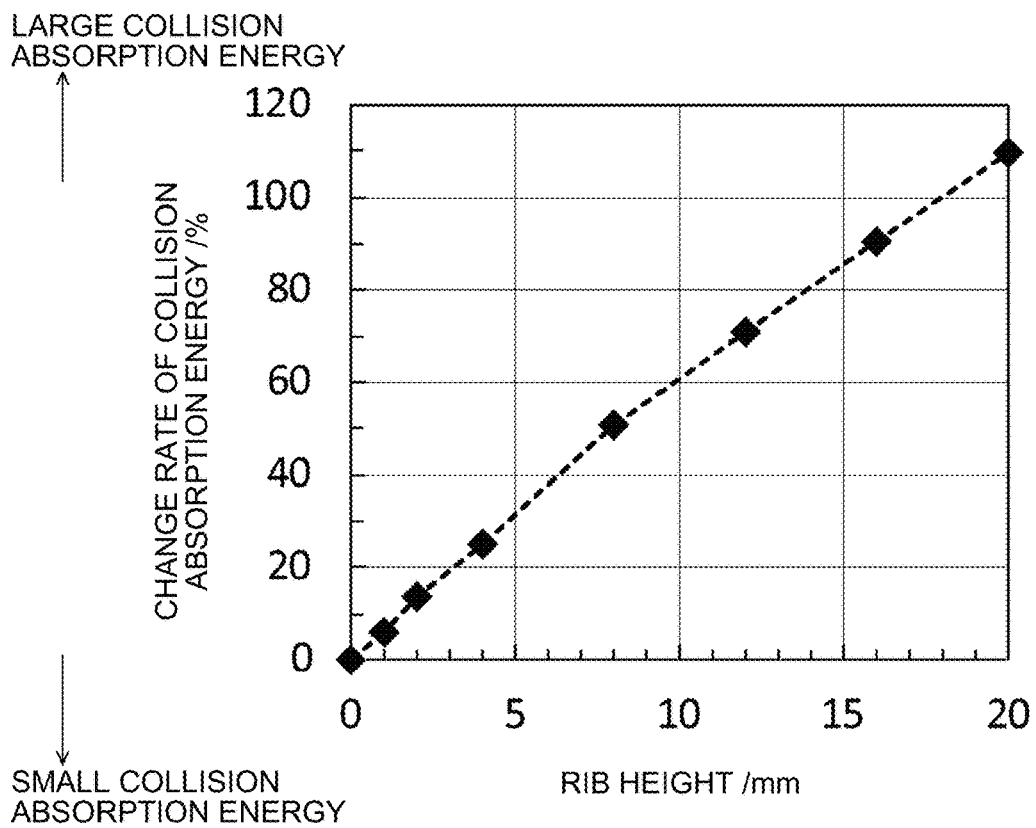
FIG. 14 is a diagram illustrating results of the change rate of collision absorption energy obtained by the axial crush test according to the second example.

FIG. 14 illustrates results of the change rate of the collision absorption energy in the invention example with reference to the collision absorption energy in the conventional example. The change rate of the collision absorption energy was calculated by the equation below.

> The change rate (%) of the collision absorption energy=((the collision absorption energy in the invention example)−(the collision absorption energy in the conventional example))/(the collision absorption energy in the conventional example)×100

In FIG. 14, the rib height of 0 mm corresponds to a result of the conventional example. The results illustrated in FIG. 14 indicate that the axial crush strength of the automotive structural part 131 according to the invention example improved as compared to the conventional example. In addition, such an effect was obtained that, as the vertical rib portion 139 is elongated higher outside a section of the automotive structural part 131, the axial crush strength of the automotive structural part 131 increases and the collision absorption energy improves when the rib height is equal to or larger than 1 mm at least.

Moreover, the present invention does not restrict the rib height of the vertical rib portion 139 to the upper limit of 20 mm although the axial crush test was performed up to the rib height of 20 mm of the vertical rib portion 139 in the second example. Furthermore, when the rib height is 20 mm or higher, the area of the flange portion 141 is larger, and thus welding is easier, which is preferable.

This verifies that the axial crush strength of the automotive structural part according to the invention example has improved.

INDUSTRIAL APPLICABILITY

According to the present invention, it is possible to provide an automotive-structural-part joint structure, an automotive structural part, and an automotive-structural-part manufacturing method, the automotive-structural-part joint structure and the automotive structural part each being formed by bending one metal sheet and each including a flange portion continuously shaped along side edges at an end part of an automotive structural part in the longitudinal direction only by bending.

REFERENCE SIGNS LIST 1 joint structure
3 top portion
5 side wall portion
7 groove portion
9 vertical rib portion
11 flange portion
11a flange portion adjacent to top
11b flange portion adjacent to side wall
11c vertical-rib flange portion
11c1 site
11c2 site
11c3 site
21 automotive structural part
23 top portion
23a side edge
23b side end 25 side wall portion
25a side edge
25b upper end
27 groove portion
29 vertical rib portion
31 flange portion
31a flange portion adjacent to top
31b flange portion adjacent to side wall
31c vertical-rib flange portion
41 upper mold
43 lower mold
45 metal sheet
51 pre-bending product
53 portion corresponding to top
55 portion corresponding to side wall
57 portion corresponding to vertical rib
57a top portion corresponding to vertical rib
57b side-wall portion corresponding to vertical rib
59 portion corresponding flange
59a portion corresponding to flange adjacent to top
59b portion corresponding to flange adjacent to side wall
59c portion corresponding flange adjacent to vertical rib
59c1 site
59c2 site
59d portion corresponding flange adjacent to vertical rib
61 punch
63 pad
65 first cam
67 second cam
71 intermediate product
81 joint structure (conventional technology)
83 top portion
85 side wall portion
87 groove portion
89 flange portion
89a flange portion adjacent to top
89b flange portion adjacent to side wall
89c corner portion at continuous flange
91 metal sheet
93 portion corresponding to top
95 portion corresponding to side wall
97a portion corresponding to flange adjacent to top
97b portion corresponding to flange adjacent to side wall
99 slit
100 joint portion
105 joint portion
110 automotive structural part
120 automotive structural part
130 specimen
131 automotive structural part
133 top portion
135 side wall portion
137 groove portion
139 vertical rib portion
141 flange portion
151 component
161 rigid body wall

The invention claimed is:

1. An automotive-structural-part joint structure formed by bending one metal sheet, the automotive-structural-part joint structure including a groove portion including a top portion and a pair of side wall portions, and the automotive-structural-part joint structure being provided at an end part of one automotive structural part in a longitudinal direction, and configured to join the one automotive structural part to another automotive structural part in an intersecting direction, the automotive-structural-part joint structure comprising:
    a pair of vertical rib portions configured to stand upward from both side ends of the top portion; and
    an outward-directed flange portion configured to extend outward from three side edges of the groove portion on an end part side where the other automotive structural part is joined, the flange portion being continuously formed along the three side edges, wherein
    each of the vertical rib portions is formed by overlapping parts of the metal sheet, one of the parts being bent upward and extending from a side end of the top portion, another part extending upward from an upper end of corresponding one of the side wall portions, and
    the flange portion includes parts of the metal sheet bent outward and extending from the respective side wall portions, a part of the metal sheet bent upward and extending from the top portion, and parts of the metal sheet bent outward and extending from the respective vertical rib portions.

2. The automotive-structural-part joint structure according to claim 1, wherein a part of the metal sheet extending from the top portion side in each vertical rib portion is removed at the flange portion.

3. An automotive structural part formed by bending one metal sheet, the automotive structural part including a groove portion including a top portion and a pair of side wall portions, and being configured to join an end part of the groove portion in a longitudinal direction to another automotive structural part in an intersecting direction, the automotive structural part comprising:
    a pair of vertical rib portions formed over the entire length in the longitudinal direction to stand upward from both side ends of the top portion; and
    an outward-directed flange portion extending outward from three side edges of the groove portion on an end part side where the other automotive structural part is joined, the flange portion being continuously formed along the three side edges, wherein
    each of the vertical rib portions is formed by overlapping parts of the metal sheet, one of the parts being bent upward and extending from a side end of the top portion, another part extending upward from an upper end of corresponding one of the side wall portions, and
    the flange portion includes a part of the metal sheet bent upward and extending from the top portion, parts of the metal sheet bent outward and extending from the respective side wall portions, and parts of the metal sheet bent outward and extending from the respective vertical rib portions.

4. The automotive structural part according to claim 3, wherein a part of the metal sheet extending from the top portion side in each vertical rib portion is removed at the flange portion.

5. An automotive-structural-part manufacturing method of manufacturing the automotive structural part according to claim 3 by bending one metal sheet, the automotive-structural-part manufacturing method comprising:
    a first bending step of, by using a punch and a pad configured to sandwich the metal sheet and a pair of first cams disposed on both sides of the punch and the pad, the first cams being configured to move toward the punch and the pad, bending the metal sheet into an intermediate product formed of the top portion, the side wall portions, and the vertical rib portions by moving the first cams toward the punch and the pad to fold parts of the metal sheet corresponding to the respective vertical rib portions of the automotive structural part while a part of the metal sheet corresponding to the top portion of the automotive structural part is sandwiched by the punch and the pad; and a second bending step of, by additionally using a second cam disposed on an end part side of the punch and the pad where the other automotive structural part is joined, the second cam being configured to move toward the punch and the pad, bending the intermediate product into the automotive structural part by moving the second cam toward the punch and the pad to bend a part of the metal sheet corresponding to the flange portion of the automotive structural part while the top portion of the intermediate product is sandwiched by the punch and the pad, and the side wall portions and the vertical rib portions of the intermediate product are sandwiched by the punch, the pad, and the first cams, wherein on the end part side of the groove portion where the other automotive structural part is joined, the second bending step includes forming a flange portion adjacent to top by bending upward a part of the metal sheet extending from the top portion, forming a flange portion adjacent to side wall by bending outward a part of the metal sheet extending from each of the side wall portions, and forming a vertical-rib flange portion by folding a part of the metal sheet extending from each of the vertical rib portions.

6. The automotive-structural-part manufacturing method according to claim 5, further comprising, before the first bending step, a pre-bending step of providing a fold line of mountain fold or valley fold at a boundary of each of the parts of the metal sheet corresponding to the top portion, the side wall portions, the vertical rib portions, and the flange portion of the automotive structural part.

7. The automotive-structural-part manufacturing method according to claim 5, further comprising, before the first bending step, a step of removing a part of the metal sheet extending from the top portion side in each vertical rib portion.

8. An automotive-structural-part manufacturing method of manufacturing the automotive structural part according to claim 4 by bending one metal sheet, the automotive-structural-part manufacturing method comprising:

a first bending step of, by using a punch and a pad configured to sandwich the metal sheet and a pair of first cams disposed on both sides of the punch and the pad, the first cams being configured to move toward the punch and the pad, bending the metal sheet into an intermediate product formed of the top portion, the side wall portions, and the vertical rib portions by moving the first cams toward the punch and the pad to fold parts of the metal sheet corresponding to the respective vertical rib portions of the automotive structural part while a part of the metal sheet corresponding to the top portion of the automotive structural part is sandwiched by the punch and the pad; and a second bending step of, by additionally using a second cam disposed on an end part side of the punch and the pad where the other automotive structural part is joined, the second cam being configured to move toward the punch and the pad, bending the intermediate product into the automotive structural part by moving the second cam toward the punch and the pad to bend a part of the metal sheet corresponding to the flange portion of the automotive structural part while the top portion of the intermediate product is sandwiched by the punch and the pad, and the side wall portions and the vertical rib portions of the intermediate product are sandwiched by the punch, the pad, and the first cams, wherein on the end part side of the groove portion where the other automotive structural part is joined, the second bending step includes forming a flange portion adjacent to top by bending upward a part of the metal sheet extending from the top portion, forming a flange portion adjacent to side wall by bending outward a part of the metal sheet extending from each of the side wall portions, and forming a vertical-rib flange portion by folding a part of the metal sheet extending from each of the vertical rib portions.

9. The automotive-structural-part manufacturing method according to claim 8, further comprising, before the first bending step, a pre-bending step of providing a fold line of mountain fold or valley fold at a boundary of each of the parts of the metal sheet corresponding to the top portion, the side wall portions, the vertical rib portions, and the flange portion of the automotive structural part.

10. The automotive-structural-part manufacturing method according to claim 6, further comprising, before the first bending step, a step of removing a part of the metal sheet extending from the top portion side in each vertical rib portion.

11. The automotive-structural-part manufacturing method according to claim 9, further comprising, before the first bending step, a step of removing a part of the metal sheet extending from the top portion side in each vertical rib portion.

* * * * *